United States Patent
Celik et al.

(10) Patent No.: US 10,944,857 B2
(45) Date of Patent: Mar. 9, 2021

(54) AUTOMATED MESSAGING

(71) Applicant: OnePIN, Inc., Westborough, MA (US)

(72) Inventors: Feyzi Celik, Hopkinton, MA (US); Marcin Nowak, Westborough, MA (US); Chris Degrace, Hopkinton, MA (US)

(73) Assignee: OnePIN, Inc., Westborough, MA (US)

( * ) Notice: Subject to any disclaimer, the term of this patent is extended or adjusted under 35 U.S.C. 154(b) by 0 days.

(21) Appl. No.: 16/719,607

(22) Filed: Dec. 18, 2019

(65) Prior Publication Data
US 2020/0128122 A1 Apr. 23, 2020

Related U.S. Application Data

(60) Continuation of application No. 16/289,061, filed on Feb. 28, 2019, now Pat. No. 10,554,804, which is a
(Continued)

(51) Int. Cl.
*H04M 1/725* (2006.01)
*H04W 4/12* (2009.01)
*H04M 1/663* (2006.01)

(52) U.S. Cl.
CPC ... *H04M 1/72552* (2013.01); *H04M 1/72519* (2013.01); *H04W 4/12* (2013.01);
(Continued)

(58) Field of Classification Search
CPC .......... H04W 4/12; H04W 4/14; H04W 4/16; H04W 12/08; H04W 4/02;
(Continued)

(56) References Cited

U.S. PATENT DOCUMENTS 8,073,460 B1 12/2011 Scofield
8,175,921 B1 5/2012 Kopra
(Continued)

FOREIGN PATENT DOCUMENTS

GB 2454576 5/2009
WO 2009023591 2/2009
WO 2014049322 4/2014

OTHER PUBLICATIONS

International Search Report and Written Opinion, dated May 1, 2015, International Application No. PCTUS2015/010860, filed Jan. 9, 2015, 17 pages.
(Continued)

*Primary Examiner* — Diane D Mizrahi
(74) *Attorney, Agent, or Firm* — Giordano Law LLC; David A. Giordano

(57) ABSTRACT

The disclosure provides methods and systems comprising an automated messaging system server operably connected to a mobile operator's network. The server receives a first message from a calling device that is addressed to a called device and comprises contents. The server reads the contents of the first message and determines a plurality of response message options, wherein at least one response message option is based on the contents. The server determines the date when the first message was received, and then, determines if the date falls in a specified date range. When the date falls in a specified range, the server includes a holiday response option in the plurality of response options. Then, the server prepares a first message package that includes the first message and response menu comprising the plurality of response options. The server sends the first message package to the called device.

9 Claims, 19 Drawing Sheets

Related U.S. Application Data division of application No. 14/994,088, filed on Jan. 12, 2016, now Pat. No. 10,264,113, which is a continuation-in-part of application No. 14/593,724, filed on Jan. 9, 2015, now Pat. No. 9,565,537.

(60) Provisional application No. 61/926,120, filed on Jan. 10, 2014.

(52) U.S. Cl.
CPC ........ *H04M 1/663* (2013.01); *H04M 1/72583* (2013.01); *H04M 2203/651* (2013.01)

(58) Field of Classification Search
CPC ......... H04M 1/72552; H04M 1/72519; H04M 2203/651; H04M 1/663; H04M 1/72583
See application file for complete search history.

(56) References Cited

U.S. PATENT DOCUMENTS

| | | | |
|---|---|---|---|
| 8,249,627 | B2 | 8/2012 | Olincy |
| 8,712,371 | B2 | 4/2014 | Baker et al. |
| 8,971,860 | B1 | 3/2015 | Olincy |
| 8,989,712 | B2 | 3/2015 | Wentker et al. |
| 9,565,537 | B2 * | 2/2017 | Celik ................ H04M 1/72519 |
| 10,067,645 | B2 | 9/2018 | King et al. |
| 10,180,772 | B2 | 1/2019 | Foss et al. |
| 10,264,113 | B2 * | 4/2019 | Celik ................ H04M 1/72519 |
| 10,268,342 | B2 | 4/2019 | Foss et al. |
| 10,338,772 | B2 | 7/2019 | Anzures et al. |
| 10,554,804 | B2 * | 2/2020 | Celik ................ H04M 1/72519 |
| 2002/0101963 | A1 | 8/2002 | Contractor |
| 2002/0159387 | A1 | 10/2002 | Allison |
| 2004/0252816 | A1 | 12/2004 | Nicolas |
| 2004/0267884 | A1 | 12/2004 | Sar-Shalom |
| 2005/0186939 | A1 | 8/2005 | Barnea et al. |
| 2005/0233733 | A1 | 10/2005 | Roundtree |
| 2005/0289095 | A1 | 12/2005 | Ruahala |
| 2006/0222152 | A1 | 10/2006 | Elias et al. |
| 2006/0271425 | A1 | 11/2006 | Goodman |
| 2006/0285661 | A1 | 12/2006 | Patel |
| 2007/0055995 | A1 | 3/2007 | Jiang |
| 2007/0106698 | A1 | 5/2007 | Elliott |
| 2007/0111748 | A1 | 5/2007 | Risbood |
| 2007/0133771 | A1 | 6/2007 | Stifleman et al. |
| 2007/0280457 | A1 | 12/2007 | Aberethy et al. |
| 2007/0281689 | A1 | 12/2007 | Altman |
| 2008/0090597 | A1 | 4/2008 | Celik |
| 2008/0261635 | A1 | 10/2008 | Samiri |
| 2008/0318554 | A1 | 12/2008 | Romppanen |
| 2009/0265220 | A1 | 10/2009 | Bayraktar |
| 2009/0280786 | A1 | 11/2009 | Ziklik |
| 2010/0100387 | A1 | 4/2010 | Kuiken |
| 2010/0325221 | A1 | 12/2010 | Cohen |
| 2011/0029380 | A1 | 2/2011 | Moukas |
| 2011/0076989 | A1 | 3/2011 | Lynch |
| 2011/0131421 | A1 | 6/2011 | Jogand-Coulomb et al. |
| 2011/0151838 | A1 | 6/2011 | Olincy |
| 2011/0151852 | A1 | 6/2011 | Olincy |
| 2011/0287746 | A1 | 11/2011 | Gopinath |
| 2012/0057689 | A1 | 3/2012 | Martin |
| 2012/0064924 | A1 | 3/2012 | Schapsis et al. |
| 2012/0101989 | A1 | 4/2012 | Ring |
| 2012/0238251 | A1 | 9/2012 | Lee |
| 2012/0315880 | A1 | 12/2012 | Peitrow |
| 2013/0086618 | A1 | 4/2013 | Klein et al. |
| 2013/0111365 | A1 | 5/2013 | Chen et al. |
| 2013/0115872 | A1 | 5/2013 | Huang |
| 2013/0130661 | A1 | 5/2013 | Berner et al. |
| 2013/0217360 | A1 | 8/2013 | Dakin |
| 2013/0238706 | A1 | 9/2013 | Desai |
| 2013/0290820 | A1 | 10/2013 | Dhanani |
| 2013/0294443 | A1 | 11/2013 | Kahn |
| 2014/0007214 | A1 | 1/2014 | Qureshi et al. |
| 2014/0026069 | A1 | 1/2014 | Dennis |
| 2014/0057610 | A1 | 2/2014 | Olincy |
| 2014/0156386 | A1 | 6/2014 | Williams |
| 2014/0169539 | A1 | 6/2014 | Mumick et al. |
| 2014/0188612 | A1 | 7/2014 | Chou et al. |
| 2014/0199960 | A1 | 7/2014 | Kahn |
| 2014/0229238 | A1 | 8/2014 | Meyer et al. |
| 2014/0229277 | A1 | 8/2014 | Khambete |
| 2014/0257985 | A1 | 9/2014 | Gibson et al. |
| 2014/0304068 | A1 | 10/2014 | Weinblatt |
| 2014/0329565 | A1 | 11/2014 | Mannix et al. |
| 2015/0019307 | A1 | 1/2015 | Girard et al. |
| 2015/0073891 | A1 | 3/2015 | Dauneria |
| 2015/0079951 | A1 | 3/2015 | Kosatka-Pioro et al. |
| 2015/0149301 | A1 | 5/2015 | Dow |
| 2015/0201313 | A1 | 7/2015 | Celik et al. |
| 2015/0341290 | A1 | 11/2015 | Cherifi et al. |
| 2016/0269521 | A1 | 9/2016 | Mendiratta et al. |
| 2017/0048372 | A1 | 2/2017 | Huang |
| 2017/0109011 | A1 | 4/2017 | Jiang |
| 2017/0142258 | A1 | 5/2017 | Seyfetdinov |
| 2017/0230495 | A1 | 8/2017 | Gupta |
| 2017/0230499 | A1 | 8/2017 | Mumick et al. |
| 2017/0237860 | A1 | 8/2017 | Mumick et al. |

OTHER PUBLICATIONS

International Search Report and Written Opinion, dated Jun. 3, 2016, International Application No. PCT/US2016/013112, filed Jan. 12, 2016, 15 pages.

International Search Report and Written Opinion, dated Aug. 11, 2016, International Application No. PCT/US2016/30634, filed May 4, 2016, 15 pages.

International Search Report and Written Opinion, dated Aug. 11, 2016, International Application No. PCT/U2016/30664, filed May 4, 2016, 15 pages.

International Search Report and Written Opinion, dated Aug. 12, 2016, International Application No. PCT/US2016/30612, filed May 3, 2016, 19 pages.

International Search Report and Written Opinion, dated Aug. 12, 2016, International Application No. PCT/US2016/30699, filed May 4, 2016, 15 pages.

International Search Report and Written Opinion, dated Sep. 16, 2016, International Application No. PCT/US2016/30764, filed May 4, 2016, 13 pages.

International Search Report and Written Opinion, dated Aug. 18, 2016, International Application No. PCT/US2016/30859, filed May 4, 2016, 12 pages.

International Search Report and Written Opinion, dated Jul. 25, 2016, International Application No. PCT/US2016/21540, filed Mar. 9, 2016, 17 pages.

* cited by examiner

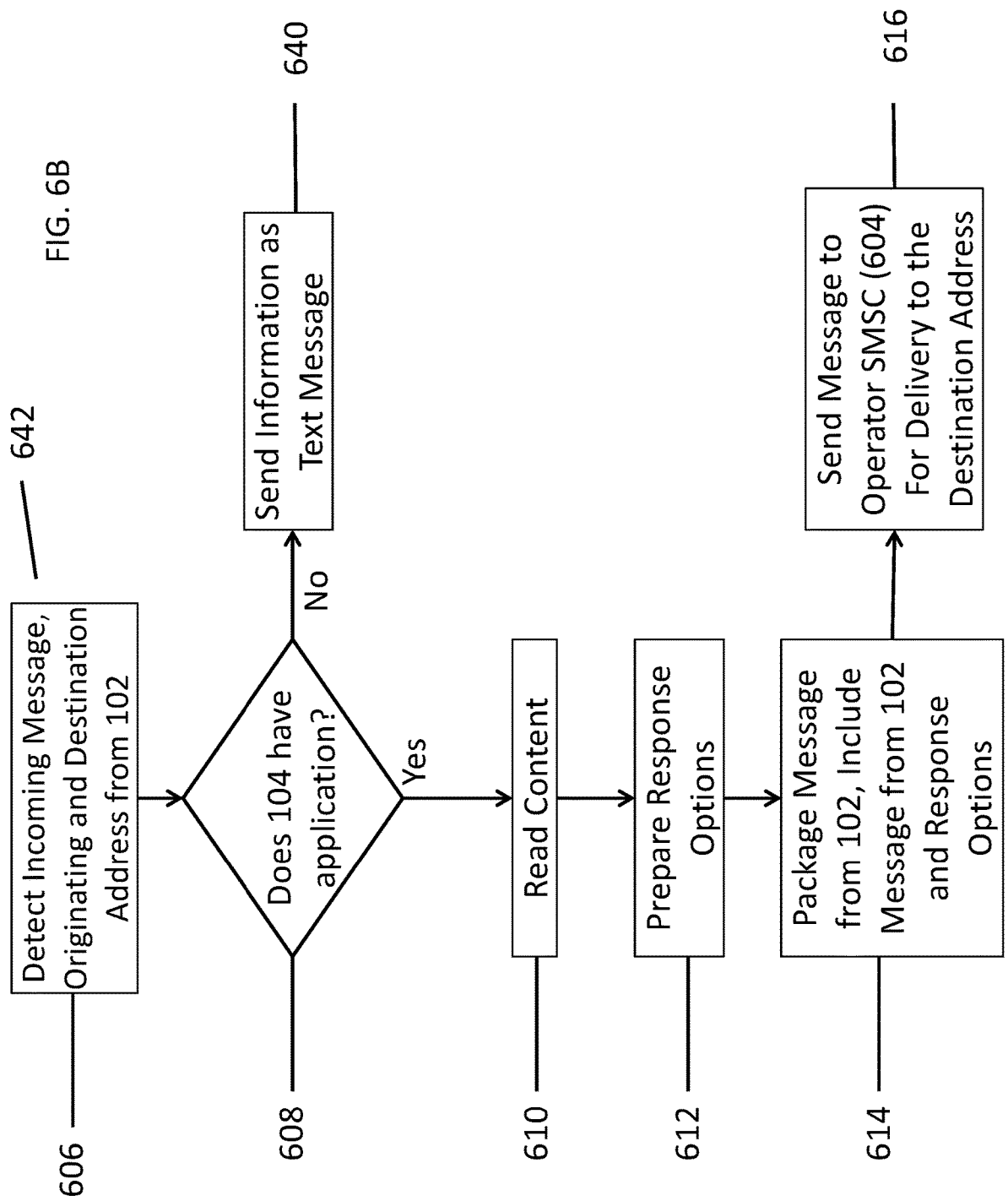

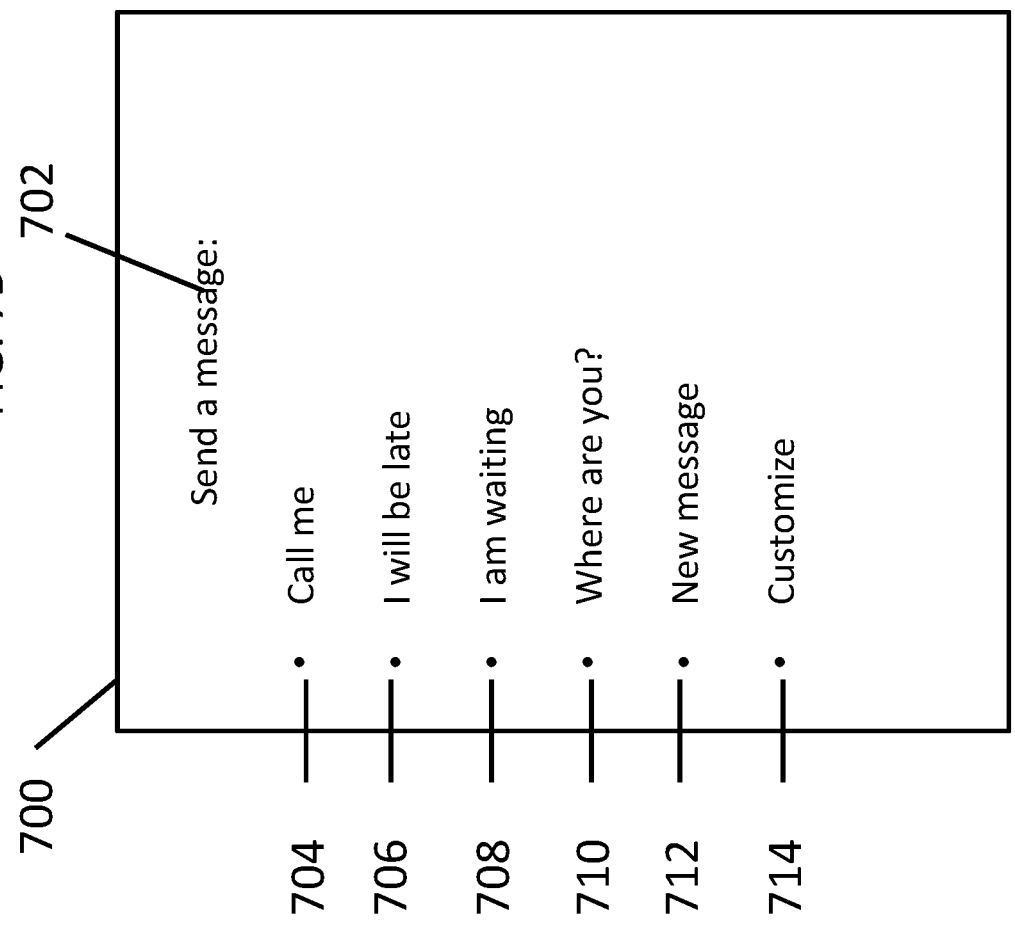

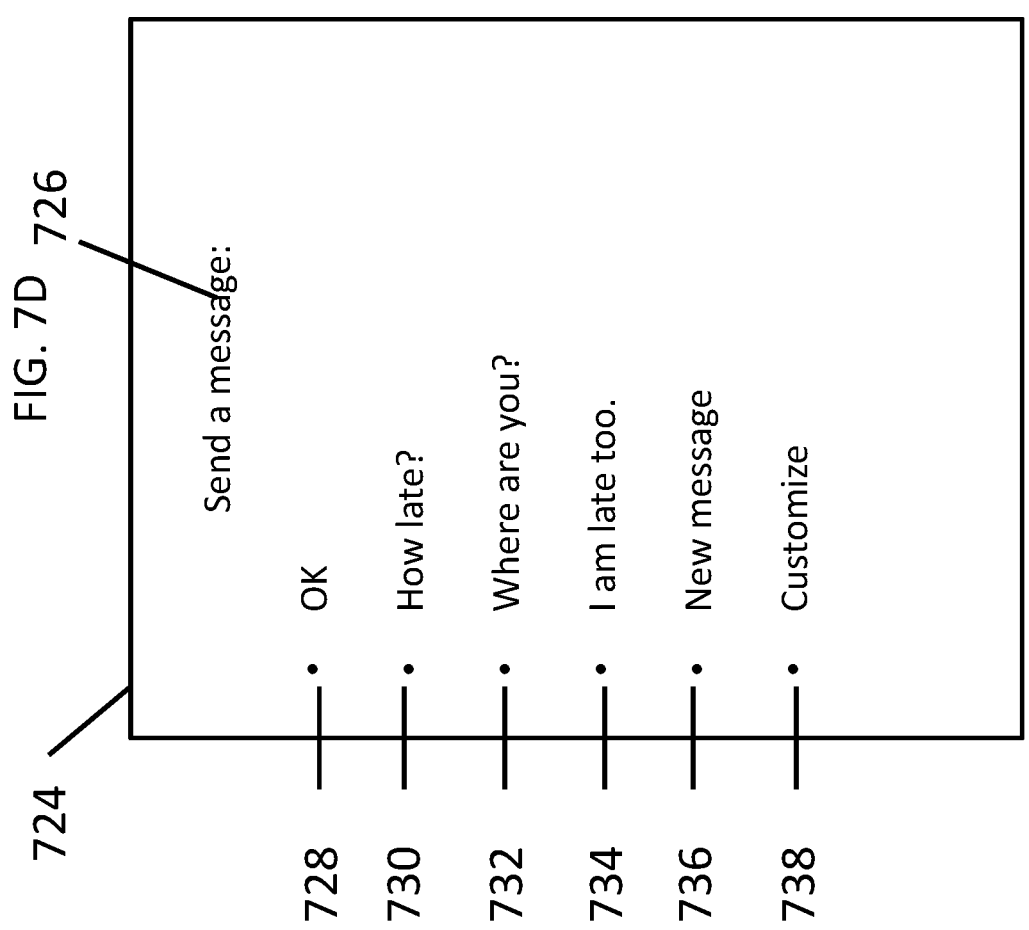

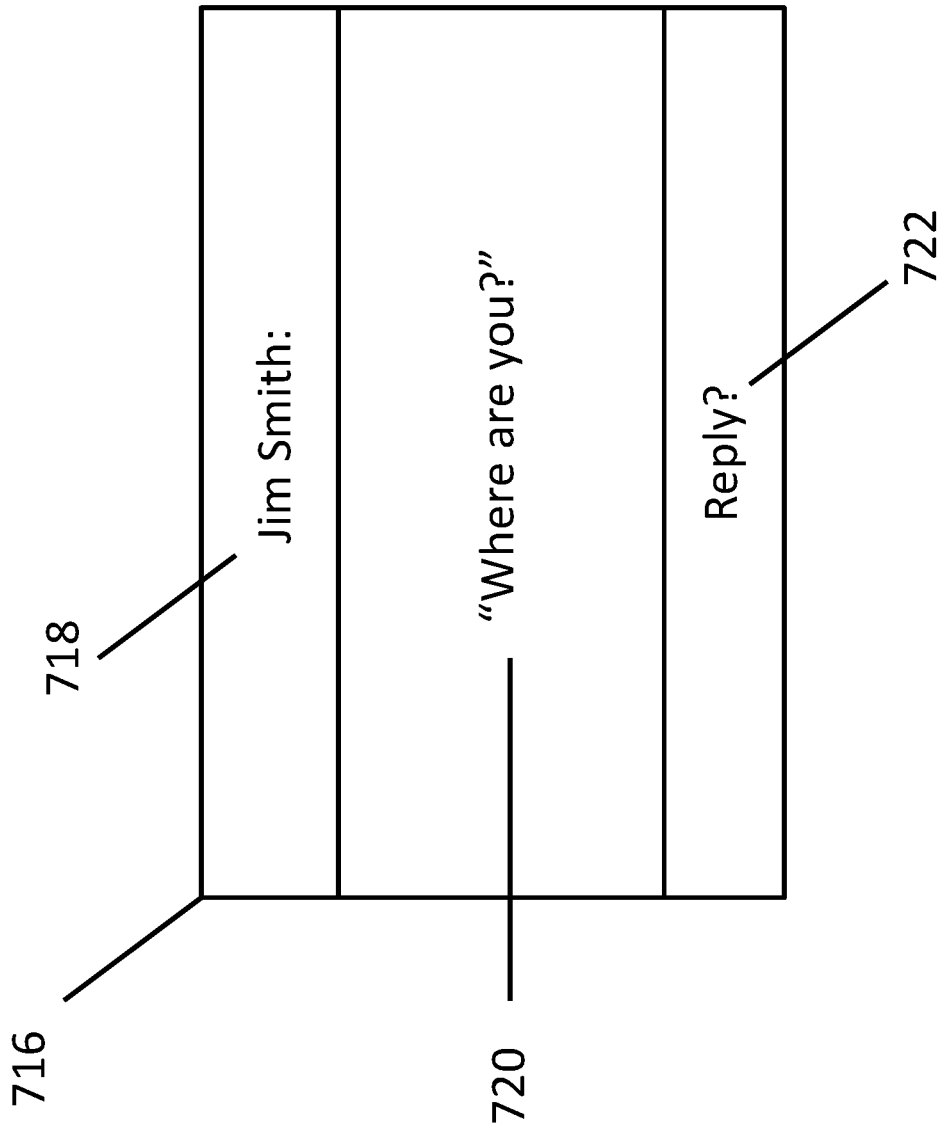

FIG. 9

| Week 1 | | |
|---|---|---|
| 902 — | AAA | 345 — 924 |
| 904 — | BBB | 120 — 926 |
| 906 — | CCC | 110 — 928 |
| 910 — | DDD | 59 — 930 |
| 912 — | EEE | 24 — 932 |
| 914 — | FFF | |
| 916 — | GGG | |
| 918 — | HHH | |
| 920 — | III | |
| 922 — | JJJ | |

946 ↗

| Week 2 | |
|---|---|
| AAA | 324 — 934 |
| BBB | 154 — 936 |
| CCC | 146 — 938 |
| DDD | 68 — 940 |
| FFF | 96 — 942 |
| EEE | |
| GGG | |
| HHH | |
| III | |
| JJJ | |

944 ↗

AUTOMATED MESSAGING

CROSS-REFERENCE TO RELATED APPLICATIONS

This application is a continuation of U.S. application Ser. No. 16/289,061, filed Feb. 28, 2019 and now U.S. Pat. No. 10,554,804, which application is a divisional of U.S. application Ser. No. 14/994,088, filed Jan. 12, 2016 and now U.S. Pat. No. 10,264,113, which is a continuation-in-part application of U.S. application Ser. No. 14/593,724, filed Jan. 9, 2015 and now U.S. Pat. No. 9,565,537, which claims priority to U.S. Provisional Patent Application No. 61/926,120, filed Jan. 10, 2014. The entire contents of those applications are incorporated herein by reference.

BACKGROUND

Many people today make and receive phone calls on mobile devices that also have messaging capabilities. Often, when a first person calls a second person, the second person will not answer the phone because the second user is busy and/or wants to ignore the caller. While a caller or callee can send a follow up written message such as a text or e-mail to the other party, doing so can be time consuming because it requires multiple steps including creating a new message, typing the message, and sending the message. Many mobile users today increasingly use short cuts in an effort to conserve text space and be more time efficient. There is a need for a service that automates the message sending process.

SUMMARY

"Short Message Service" or "SMS" text messaging has become one of the most popular communication tools due to its speed and convenience. People can send messages to one another independent of their geographic location. Moreover, communication between different people is often similar. Many people ask each other similar questions, to which they frequently respond similarly.

In light of this, it has been discovered that responses to certain questions can be predicted. One aspect of this disclosure relates to an automated messaging platform where communication between people is organized in a predictive manner.

This automated messaging system has several embodiments.

Certain embodiments disclosed herein generally relate to a messaging system that can enable mobile subscribers to automatically send messages to people they have called or received calls from, for example, in the circumstance where a call is terminated without a connection (e.g., where the call recipient did not answer the call). For example, the automated messaging system can automatically detect that a calling subscriber has called a called subscriber, and that the called subscriber did not answer the call. After the calling subscriber ends the phone call attempt (and/or the call is otherwise terminated), the automated messaging system can automatically prompt the calling subscriber, and provide several messaging options. For example, the options presented to the calling subscriber can include both preset messages ("canned messages") as well as customizable messages edited or written by the subscriber. Messaging options can also include music, pictures, videos, or any other digital imaging selections—either preset or chosen by the user. In other embodiments, the system can work in a similar manner when a called user ignores or misses a phone call. For example, if a called subscriber does not answer a phone call, the called subscriber can be automatically presented with a list of text messages to send to the calling subscriber.

Whether it is the caller or callee, when a messaging subscriber sends a message to the receiving subscriber, the receiving subscriber will then be presented with a list of messaging options that are predictive replies in response to the content of the message they received. Similarly, then the messaged subscriber will be presented with another unique list of messages specific to the message they received. Each message option correlates to a unique set of responses on a new message option list. In some embodiments, the user can create and send a message by pressing a single button.

The automated messaging system can be used with a mobile phone, but can also be used with other devices that can be configured to make phone calls. For example, tablets and other computers that include SKYPE® or GOOGLE VOICE™ can also make use of the automated messaging system.

One embodiment of the system described herein is referred to as MessageXpress (or MsgXpress) being developed by OnePIN, Inc. of Westborough, Mass. However, other names/embodiments of the service described herein are within the scope of the disclosed subject matter.

In general, in an aspect of this disclosure, some embodiments of the present disclosure are directed at a computer-implemented method for automatically prompting a calling user to send a message to a called user, the calling user using a calling device and the called user using a called device. The method can comprise receiving, at a processor in the calling device, an indication that a call from the calling device to the called device has disconnected. The method can further comprise determining, at the processor in the calling device, whether the call connected before receiving the indication that the call has disconnected. In response to determining that the call did not connect before receiving the indication that the call has disconnected, the method can comprise determining that the call was a missed call.

In some embodiments, the method can further comprise, in response to determining that the call was a missed call, at least some of the following steps: (i) automatically prompting on a display of the calling device a menu having a plurality of selectable menu items, at least some of the selectable menu items corresponding to respective stored phrases; (ii) receiving, at the processor, user input from the calling user selecting one of the selectable menu items; (iii) sending a message from the calling device to the called device including the stored phrase corresponding to the selected menu item. In certain embodiments, the method can further comprise, in response to the message sent from the calling device to the called device: (iv) automatically displaying message sent from calling device on the called device and presenting the option to reply; (v) if reply option is selected by callee, automatically prompting on a display of the called device a menu having a plurality of selectable menu items, mainly comprised of predictive messages generated in response to received message on the called device from the calling device; (vi) receiving, at the processor, user input from the called user selecting one of the selectable menu items; (vii) sending a message from the called device to the calling device including the stored phrase corresponding to the selected menu item; (viii) automatically displaying message sent from called device to calling device and presenting the option to reply; (ix) if reply option is selected by caller, automatically prompting on a display of the calling device a menu having a plurality of selectable menu items, mainly comprised of predictive messages generated in response to received message on the calling device from the called device; (x) repeat steps ii-ix for all succeeding text message exchanges.

As described above, after step (x), each individual can send each other these pre-prepared predictive messages back and forth in a similar fashion.

In some embodiments, the method can further comprise in response to determining that the call connected to the called user before receiving the indication that the call has disconnected, preventing the menu from being displayed.

In some embodiments, the method can further comprise changing the menu based on instructions received from an automated messaging system server by performing at least one of adding a selectable menu item, deleting a selectable menu item, editing a selectable menu item, and editing at least one of the stored phrases.

In some embodiments, the method can further comprise receiving, at the processor in the calling device, user input indicating that the calling user desires to customize at least one of the stored phrases. The method can also further comprise receiving, at the processor in the calling device, user input including desired changes to at least one of the respective stored phrases; and storing, at a memory coupled to the processor in the calling device, the desired changes.

In some embodiments, the method can further comprise determining, at the processor in the calling device, whether the calling device is capable of detecting a network originated call connected event.

In general, in another aspect, some embodiments of the present disclosure are directed at a device comprising a processor, a display coupled to the processor, a non-transitory storage memory coupled to the processor having a record of previous call events, and an automated messaging module implemented using the processor. The automated messaging module can be configured to receive an indication from the processor that a call from the device to a called device has disconnected, determine, using the record of previous call events, whether the call connected before receiving the indication that the call has disconnected, and in response to determining that the call did not connect before receiving the indication that the call has disconnected, determine that the call was a missed call.

In some embodiments, the automated messaging module of the calling device can be further configured to, in response to determining that the call was a missed call, perform at least some of the following actions: (i) automatically prompt on the display a menu having a plurality of selectable menu items, at least some of the selectable menu items corresponding to respective stored phrases, (ii) receive user input selecting one of the selectable menu items, (iii) send a message from the device to the called device including the stored phrase corresponding to the selected menu item.

Another embodiment of this disclosure is can be the personalization of predictive messages. Though most people might respond similarly to simple questions concerning location, health and personality, people in a particular geographic location are also more likely to communicate in a specialized way. The automated messaging system of this disclosure can be a predictive messaging platform where a set of responses generated for a received message may change over time for a specific region. The uniqueness of messages displayed to a subscriber can be customized on an individual and national level. For example, out of ten possible predictive messages for each received message, only a certain number (e.g., five) of these ten options would be displayed on a user's mobile device. Periodically, (e.g., each day, week, month, quarter, year, etc.), the messaging option used with the lowest frequency will be replaced with one of the messaging options that were not previously displayed. Thus, the messaging options available in response to a specific message will be different for each succeeding week. The same method can be used on the individual level. The messaging options for a single user will be set based on the user's personal behavior and messaging patterns. The update of these predictive messaging menus, on both a large and smaller scale, will keep the application current and relevant for users.

In some embodiments, the general automated messaging module can be further configured to, in response to a message sent from the one device to another, perform at least some of the following actions: (i) detect message, (ii) correlate message with predictive potential responses to the content of received message, (iii) prepare list of potential responses to the received message, (iv) send text message and predicted response options to receiving device.

The automated messaging module of the called device can be further configured to, in response to receiving a message from the calling device, perform at least some of the following actions: (i) detect incoming message from calling subscriber, (ii) automatically prompt on the display the message received and option to reply, (iii) receive user input to reply, (iv) automatically prompt on the display a menu having a plurality of selectable menu items comprised mostly of predictive responses to the message sent from the caller to the callee, (v) receive user input selecting one of the selectable menu items, (vi) sending a message from the called device to the calling device as an automated response to a message sent from the calling device, a stored phrase corresponding to a menu item selected by the callee.

In one aspect, this disclosure provides a computer-implemented method for automatically prompting a called user to send a message to a calling user. In the method, the called user uses a called device and the calling user uses a calling device. The method comprises: receiving at the called device a first message package comprising a first message from the calling device and a first menu of response message options. The response message options are based on the first message. The method further comprises displaying on a screen of the called device the first message. In some embodiments, the calling device comprises a first operating system and the called device comprises a second operating system. In some embodiments, the first operating system and the second operating system are different.

In some embodiments, the method can also include, prior to the called device receiving the first message package, receiving at the called device receives a call from the calling device that does not connect (e.g., a missed call). In some embodiments, the method includes displaying on the screen of the called device an option to respond to the displayed first message. In the method, the processor of the called device can receive user input indicating that the called user desires to respond to the first message. Once such user input is received at the processor, the method displays the first menu of response message options on the screen of the called device.

In some embodiments, the user does not need to choose to respond. Instead, the first menu of response message options is displayed on the screen automatically.

In some embodiments, the method further comprises: receiving at the processor of the called device user input from the called user selecting one of the response message options from the first menu of response message options;

and sending from the called device to the calling device a message, wherein the message comprises a message corresponding to the response message option selected by the called user.

In some embodiments, the first menu of response message options comprises an option to customize a response message. In certain embodiments, the method comprises: receiving at the processor of the called device user input indicating that the called user desires to customize a response message; receiving at the processor of the called device user input including the called user's desired customized message; and storing the called user's desired customized message at a memory coupled to the processor in the called device.

In some embodiments of the method, a response message option is selected for the first menu of response message options based on the location of the called user. In certain embodiments of the method, the response message option comprises the name of a third party. In some embodiments, a response message option is selected for the first menu of response message options from a plurality of response message options based on the frequency the response message option is used in a geographic area. In further embodiments, a response message option is selected for the first menu of response message options from a plurality of response message options based on the time of day. In yet further embodiments, at least one of the response message options is a non-text option. In some embodiments, the non-text option is a music, picture or video file. In some embodiments, a response message option is selected for the first menu of response message options from a plurality of response message options based on the frequency of communication between the called user and the calling user.

Another aspect of this disclosure is directed to a device comprising a processor; a display coupled to the processor; a non-transitory storage memory coupled to the processor; and an automated messaging module implemented using the processor and configured to: receive a message package comprising a message and a menu of response message options; display the message; and automatically display the menu of selectable response message options; receive user input selecting one of the response message options; and cause a message corresponding to a selected response message option to be sent from the device to a second device.

In certain embodiments, the automated messaging module is further configured to: automatically prompt on the display an option to respond to the message; receive user input selecting the option to respond; and automatically display the menu of selectable response message options in response to the option to respond being selected. In some embodiments, the automated messaging module is further configured to: change the menu based on instructions received from an automated messaging system server by performing at least one of adding a selectable menu item, deleting a selectable menu item, editing a selectable menu item, and editing at least one stored phrases. In some embodiments, the automated messaging module is further configured to: include an option to customize a message as one of the response message options; receive user input indicating that the user desires to customize a message; receive user input including the user's desired customized message; and storing the user's desired customized message at a memory coupled to the processor in the called device.

Another aspect of this disclosure is directed to a computer-implemented method for preparing a message package for automatically prompting a called user to send a message to a calling user, the calling user using a calling device and the called user using a called device, the method comprising: receiving, at an automated messaging system server, a first message from the calling user; reading the contents of the first message; determining response message options based on the contents of the first message; preparing a response menu comprising response message options; preparing a first message package comprising the first message and the response menu; sending the first message package to the called device. In some embodiments, determining response message options further comprises: comparing the contents of the first message to messages stored at the server or at a connected server; identifying response messages sent in response to the first message; and compiling a list of response message options based on the response messages identified. In some embodiments, the response message options are based on the contents of the first message. In some embodiments, list of response message options is ordered based on the frequency with which the response messages were sent.

In some embodiments of the method, the list of response message options is stored. The list can be stored on a server or a connected server. In some embodiments, the method further comprises compiling, at a later time, a second list of response message options based on the message, placing the second list of response message options in order based on the frequency with which the response messages were sent, and replacing the original stored list of response message options with the second list of response message options.

In some embodiments, determining response message options further comprises comparing the contents of the first message to messages stored at the server or at a connected server, identifying one or more third party response message options stored at the server or at a connected server that correspond to the first message; and compiling a list of response message options comprising one or more third party response message options identified.

In some embodiments, determining response message options further comprises determining whether the message has been previously sent from the calling user to the called user. When it is determined that the message has been previously sent from the calling user to the called user, then previous response messages sent from the called user to the calling user in response to the message are identified. Then, a list of response message options comprising one or more of the response message options identified is compiled.

In some embodiments, the automated messaging module can be further configured to, in response to determining that the call connected to the called device, prevent the menu from being displayed.

In some embodiments, the automated messaging module can be further configured to change the menu based on instructions received from an automated messaging system server by performing at least one of adding a selectable menu item, deleting a selectable menu item, editing a selectable menu item, and editing at least one stored phrases.

In some embodiments, the automated messaging system application can be further configured to receive user input indicating that the user desires to customize at least one of the respective stored phrases, receive user input including desired changes to at least one of the stored phrases, and store in the storage memory the desired changes.

In some embodiments, the automated messaging module can be further configured to determine whether the device is capable of detecting a network originated call connected event.

In general, in yet another aspect, some embodiments of the present disclosure are directed at a computer-implemented method for automatically prompting a calling user to send a message to a called user, the calling user using a calling device and the called user using a called device. The method can comprise receiving, at a processor in the calling device, an indication that a call from the calling device to the called device was a missed call. In response to receiving the indication, the method can comprise at least some of the following steps: (i) automatically prompting on a display of the calling device a menu having a plurality of selectable menu items, at least some of the selectable menu items corresponding to respective stored phrases, (ii) receiving, at the processor, user input from the calling user selecting one of the selectable menu items, and (iii) sending a message from the calling device to the called device including the stored phrase corresponding to the selected menu item.

In some embodiments, the general automated messaging module can be further configured to, in response to a message sent from the one device to another, perform at least some of the following actions: (i) detect message, (ii) correlate message with predictive potential responses to the content of received message, (iii) prepare list of potential responses to the received message, (iv) send text message and predicted response options to receiving device.

The automated messaging module of the called device can be further configured to, in response to receiving a message from the calling device, perform at least some of the following actions: (i) detect incoming message from calling subscriber, (ii) automatically prompt on the display the message received and option to reply, (iii) receive user input to reply, (iv) automatically prompt on the display a menu having a plurality of selectable menu items comprised mostly of predictive responses to the message sent from the caller to the callee, (v) receive user input selecting one of the selectable menu items, (vi) sending a message from the called device to the calling device as an automated response to a message sent from the calling device, a stored phrase corresponding to a menu item selected by the callee.

In some embodiments, the indication can be received from an automated messaging system server.

In some embodiments, the method can further comprise changing the menu based on instructions received from an automated messaging system server by performing at least one of adding a selectable menu item, deleting a selectable menu item, editing a selectable menu item, and editing at least one of the stored phrases.

In some embodiments, the method can further comprise receiving, at the processor in the calling device, user input indicating that the calling user desires to customize at least one of the stored phrases. The method can also further comprise receiving, at the processor in the calling device, user input including desired changes to at least one of the respective stored phrases. The method can also comprise storing, at a memory coupled to the processor, the desired changes.

In some embodiments, the method can comprise determining, at the automated messaging system server, whether the call was a missed call based on information received from a mobile operator's network.

In some embodiments, the indication can comprise at least one of a binary SMS message, a USSD command, an MMS message, a class 2 regular SMS message, and an IP-based communication.

In some embodiments, the missed call can include at least one of a call that was answered by voicemail prior to connection and a call that was intercepted by the carrier prior to connection.

In general, in still another aspect, some embodiments of the present disclosure are directed at a device comprising a processor, a network interface coupled to the processor, a display coupled to the processor, and an automated messaging module implemented using the processor. The automated messaging module can be configured to receive an indication from the network interface that a call from the device to a called device was a missed call. In response to receiving the indication, the automated messaging module can be configured to automatically prompt on the display a menu having a plurality of selectable menu items, at least some of the selectable menu items corresponding to respective stored phrases; receive user input selecting one of the selectable menu items; and send a message from the device to the called device including the stored phrase corresponding to the selected menu item.

In some embodiments, the indication can be received from an automated messaging system server.

In some embodiments, the automated messaging module can be further configured to change the menu based on instructions received from an automated messaging system server by performing at least one of adding a selectable menu item, deleting a selectable menu item, editing a selectable menu item, and editing at least one stored phrases.

In some embodiments, the automated messaging module can be further configured to receive user input indicating that the user desires to customize at least one of the stored phrases; receive user input including desired changes to at least one of the respective stored phrases; and store in a storage memory the desired changes.

In some embodiments, the indication comprises at least one of a binary SMS message, a USSD command, and a class 2 regular SMS message.

In some embodiments, the missed call can include at least one of a call that was answered by voicemail prior to connection and a call that was intercepted by the carrier prior to connection.

Possible benefits of the automated messaging system for the called subscriber can include:

Instant Notification: The called party can receive an instant notification (e.g., an SMS message) that someone has called. The called party can quickly and easily see who called and when they called without having to listen to a voicemail or navigate to a "missed call" list. The called party knows who called (both the name and phone number can be displayed) even if the called party does not have this contact in his or her phonebook. Not having to listen to a voicemail is can be a significant benefit as dialing a voicemail system takes time and the time spent listening to messages can count against a subscribers' minute balance.

Relevance: The called party can receive important information, such as the name of the caller (e.g., John Smith) and the time of the call (e.g., 9:15 AM).

Increased social connection: The called party can easily call the calling party back by clicking on the phone number without typing the number.

Time-efficient: The called party can easily respond to the calling party with one click by selecting a response from a list of message options presented in a display menu catered specifically for the message received.

Possible benefits of the automated messaging system for the calling subscriber can include:

Simplicity: One party can send a message to the other automatically without any typing.

Customization: The calling party can save predetermined messages that he or she frequently sends to contacts after unanswered calls. These customized predetermined messages can be automatically presented to the calling party after a call attempt.

Higher Chance of Prompt Reply: The calling party is more likely to get a fast response since the messaging process to reply was simplified on the end of the called party.

Possible benefits of the automated messaging system for mobile operators can include:

Increased Voice/SMS Usage (Higher ARP U) and Reduced Churn: More return calls can be made, because the original called subscriber knows who called. For example, the called subscriber can receive a name and not merely a phone number. This additional information can lead to an increased call back rate.

In general, most mobile calls result in a phone conversation. However, there is a percentage of calls where the call is not answered and these calls are dubbed "Missed Calls". Missed calls can happen for a variety of reasons. For example, the called subscriber might have switched off their phone, the called subscriber may be in a geographic area where there is no mobile network coverage, and/or the called subscriber may decide not to answer the call. Missed calls can be a source of lost revenue for mobile operators. The automated messaging system can personalize the missed calls by providing detailed contact information and times when the missed call occurred. These messages can create new calls or SMS messages as a follow up to the initial call. The automated messaging system can personalize the automatically generated messages by providing, for example, names of the calling subscriber and can increase the likelihood of the called subscriber calling back the calling subscriber.

Similarly, the predictive messaging system increases the likelihood for one party to receive a response from the other. When a user receives a message, they generally must think of a response and type it (which is effort a user may not be able to afford at certain times). If they are presented a list of relevant potential responses, the user is more likely to respond given that the decision-making process and execution is simpler.

Embodiments of the subject matter described herein can also provide at least the following benefits:

The techniques described herein can provide enhanced information (e.g., more than basic information) relating to the missed call. For example, the automated messaging system can provide to the message recipient a personalized message, with a personal name included, which can reduce the likelihood that the message is interpreted by the called subscriber as "spam" or uninformative. Also, the messages can be generated by an application on the calling subscriber's mobile device or the called subscriber's mobile device, rather than on the mobile network itself, thus reducing the overall complexity of the system needed to implement the techniques described herein.

The techniques described herein can assist the calling subscriber, and not only the receiving subscriber. For example, the automated messaging system allows the calling subscriber to be automatically prompted to send a message to the called subscriber in addition to the other way around. Additionally, the both subscribers are more likely to receive a response as the party they are trying to communicate with are presented with a facile way to respond quickly to a received message or call. Messages for each question are customizable by region and by person, making communication relevant and faster for users.

Further, the systems and methods disclosed here are interoperable between device types. The systems and methods do not depend on the device operating system. They also do not depend on a specific network—i.e., the systems and methods can be used between mobile subscribers on different mobile operating networks, and can also be used between subscribers in different countries and areas of the world, regardless of network, application version, or device operating system.

DESCRIPTION OF THE FIGURES

FIG. 6B is a flowchart illustrating the process by which a message is processed by the automated messaging system cloud server and sent to the destination target.

FIG. 7B illustrates an exemplary mobile device screen displaying a menu showing different messaging options.

FIG. 7D illustrates an exemplary mobile device screen displaying a menu showing different messaging options as predictive responses to a prior message.

FIG. 7E illustrates an exemplary mobile device screen displaying an incoming message.

FIG. 9 illustrates an exemplary process by which displayed messaging options are kept up to date at regular time intervals.

DETAILED DESCRIPTION

Embodiments of the disclosed subject matter can provide a messaging system that can enable mobile subscribers to automatically send written messages to people they have called and/or received call from, preferably in the circumstance where a call is terminated without a connection (e.g., where the call recipient did not answer the call). The automated messaging system can automatically detect that a calling subscriber has called a called subscriber, and that the called subscriber did not answer the call. After the calling subscriber ends the phone call attempt (and/or the call is otherwise terminated), the automated messaging system can automatically prompt the calling and/or called subscriber, and provide several messaging options. For example, the options presented to the subscriber can include both preset messages ("canned messages") as well as customizable messages edited or written by the subscriber. In some embodiments, the system can work in a similar manner when a user ignores or misses a phone call. For example, if a called subscriber does not answer a phone call, the called subscriber can be automatically presented with a list of text messages to send to the calling subscriber. This disclosure also provides an automated messaging system that can predict responses to certain messages and prepare message packages that comprise a message and response message options, enabling users to more quickly send messages to each other. Other embodiments are within the scope of the disclosed subject matter.

Figure 1:
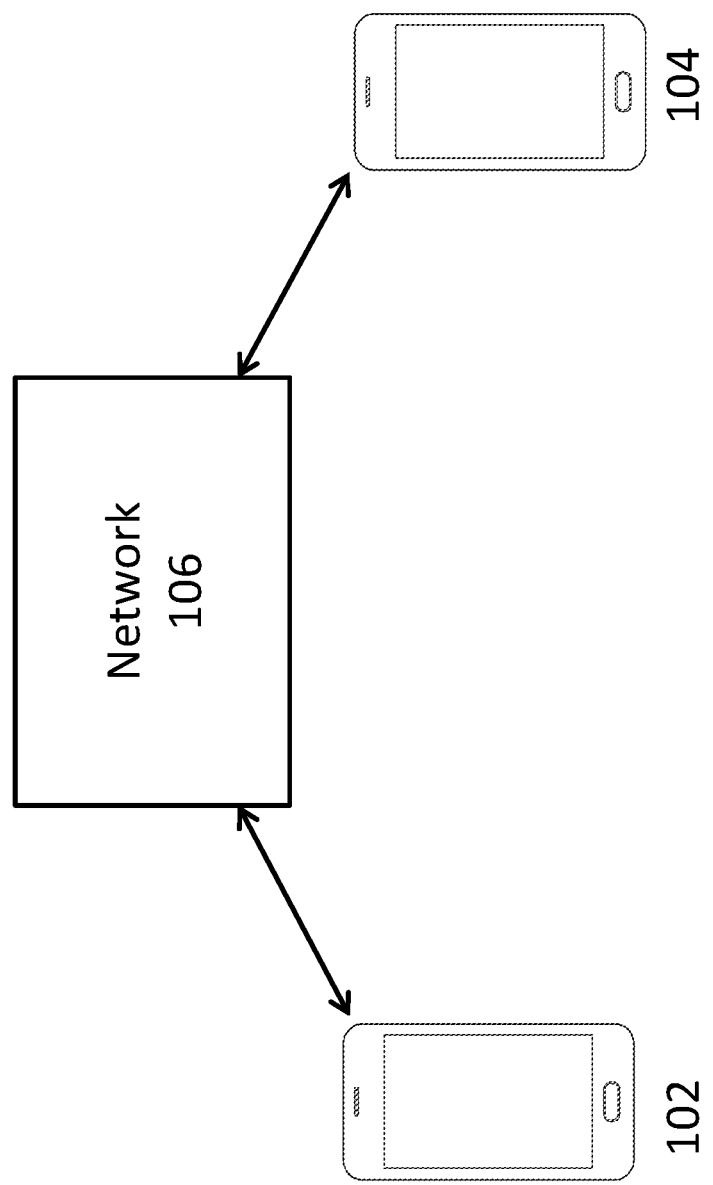
FIG. 1 is a logical block diagram showing an exemplary mobile phone system in which an automated messaging system can operate.

FIG. 1 shows an exemplary mobile phone system in which the automated messaging system can operate. FIG. 1 includes a first subscriber's (e.g., a calling subscriber's) mobile device 102, a second subscriber's (e.g., a called subscriber's) mobile device 104, and a network 106. The first subscriber (e.g., John) can place calls from mobile device 102 to the second subscriber's (e.g., Jill's) mobile device 104 via network 106. Similarly, the second subscriber (e.g., Jill) can place calls from mobile device 104 to the first subscriber's (e.g., John's) mobile device 102 via network 106. Each of the mobile devices 102 and 104 can also be configured to send/receive texts and send/receive data such as e-mails, webpages, and video data. The mobile devices 102 and 104 can be any communication device such as a mobile phone (e.g., APPLE® IPHONE®, SAMSUNG GALAXY, MOTOROLA® MOTO®), and/or a tablet (e.g., APPLE® IPAD®, MICROSOFT SURFACE®, AMAZON® KINDLE®). Lastly, while the specification herein focuses on "mobile" devices, this is not required. For example, the techniques described herein can also apply to non-mobile devices such as desktop computers.

In some embodiments, network 106 can be a wireless cellular or data network maintained by a mobile operator, and can comprise multiple sub-networks and back-end servers. For example, the network 106 can include base stations (eNodeBs), a voice network for handling voice calls and texts, a packet switched network for handling mobile data, backhaul networks, messaging servers, etc. Exemplary versions of the network 106 can be provided by, for example, Verizon®, AT&T®, T-Mobile®, INWI®, Vodafone®, Claro®, and Orange®.

The following example shows one operation of the automated messaging system. John calls Jill from his mobile device 102. Jill's mobile device 104 rings. Jill is busy; she does not answer the call. On the screen of John's mobile device 102, the following list of message phrases can automatically appear after the call attempt ends (e.g., without any action by John):
  Send A Message:
  Call me back
  I will be late
  I am waiting
  Where are you?
  New message
  Customize (e.g., mobile subscribers can change these messages and enter their own text)

In some embodiments each of the potential messages can be displayed as a user-selectable button on the interface of the mobile device. In this manner, a user can automatically create and send a message containing the selected phrase by simply tapping on the selected phrase.

Continuing with the example, assume that John chooses "Call me back" to send in a message. The automated messaging system can then send an automated message to Jill without any additional information from John. When Jill has a chance to look at her phone 104, she will see on her mobile device screen that she has a new message, which reads as:

---
John:
"Call me back"
Reply?
---

John:
"Call me back"
Reply?
If Jill selects "Reply?" she will be presented with a menu of pre-set response message options that she can select to send. As is described more fully below, the original phrase selected by John can be supplemented with the additional information shown above.

In some embodiments, this message is sent as an SMS message (commonly known as a text message) from John's mobile device 102 to Jill's mobile device 104, although other messaging types can also be used. For example, John's mobile device 102 can be configured to send an SMS message, an e-mail, send an instant message, send an MMS message, send a FACEBOOK® message, TWEET® a message (e.g., via TWITTER®), send an IMESSAGE®, post a message on Jill's FACEBOOK® page, leave a voicemail, send a snapchat message, etc. The message can be sent directly from the automated messaging system application itself and/or can involve the use of third-party applications installed on the phone (e.g., the automated messaging system can cause a FACEBOOK® application installed on the phone to send a message).

The automated messaging system can comprise an application that is obtained and installed on a user's mobile device (e.g., mobile device 102 and 104) as well as one or more servers configured to communicate and interact with the applications installed on the mobile device. These one or more servers can be part of network 106 or elsewhere. The automated messaging system can be implemented on servers maintained and operated by a wireless network operator that maintains the network 106. Additionally, the automated messaging system can be implemented on servers maintained and operated by a third party (e.g., a separate entity than the entity that maintains network 106). As another option, the automated messaging system can be implemented on a "cloud" network, in which the server portion of the automated messaging system is implemented as a set of virtual software instances running on a set of shared, distributed hardware resources.

The automated messaging system can also be implemented entirely on a stand-alone automated messaging system application installed on a subscriber's mobile device. In such embodiments, the automated messaging system does not require any back-end servers beyond that required for normal message and data exchange between any two subscriber's mobile devices. In other embodiments, the automated messaging system can employ back-end servers, for example, to intercept messages and prepare response message options.

Figure 2:
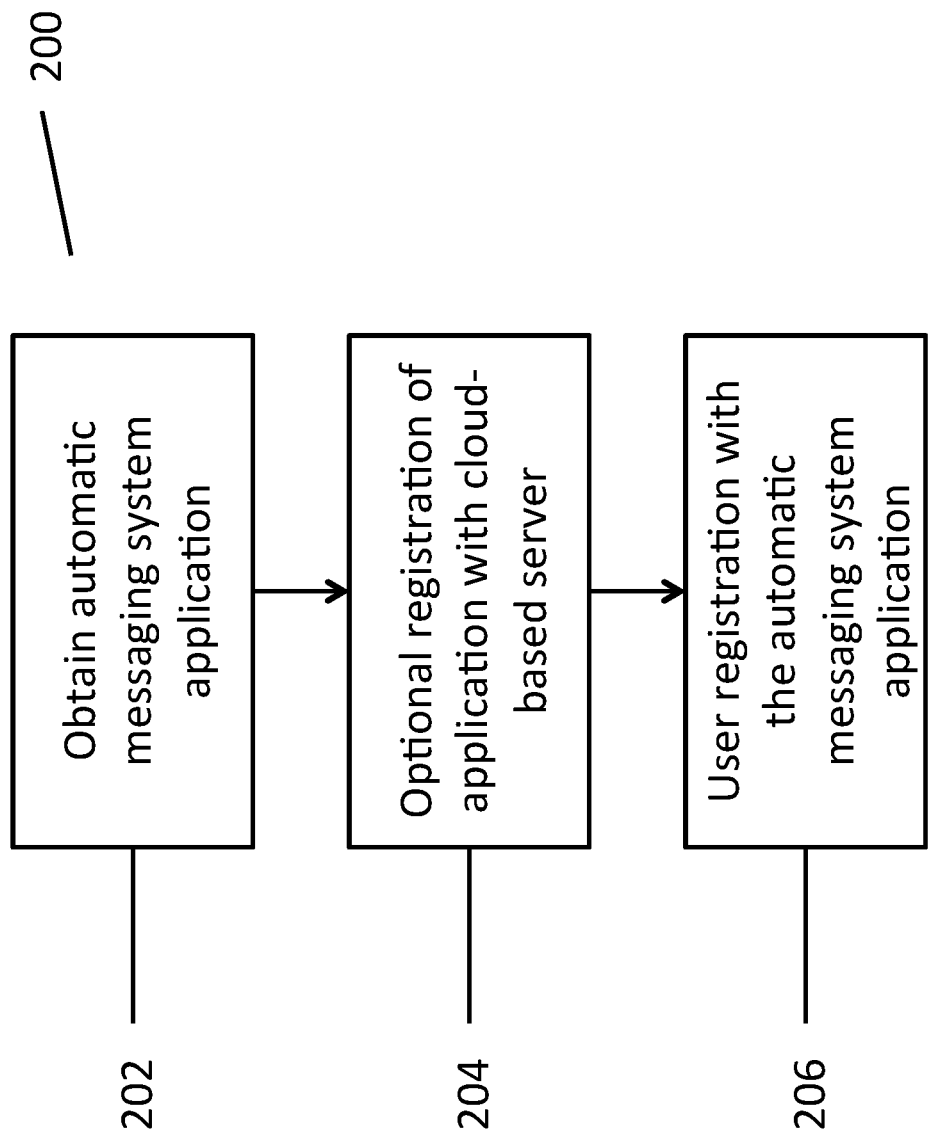
FIG. 2 is a flowchart showing an exemplary process of obtaining and initializing an automated messaging system application on a subscriber's mobile device.

FIG. 2 is a flowchart showing an exemplary process 200 of obtaining and initializing an automated messaging system application on a subscriber's mobile device (e.g., on mobile device 102 or 104). The process 200 is exemplary only and stages may be added, removed, altered, and/or reordered. In some embodiments, this process can be carried out when the automated messaging system application is first installed and/or activated on a mobile device.

At stage 202, the automated messaging system application can be obtained by a subscriber (e.g., John or Jill). For example, the messaging system application can be implemented as: i) an application that is downloaded and installed on a mobile device (e.g., from an app store), ii) the application can be part of and/or installed on a SIM card in the mobile device (for devices that use SIM cards), and/or iii) the application can be installed in the mobile device by the manufacturer of the device. In some embodiments, the application is installed such that it has access to call control events and/or other mechanisms by which it can tell that a call has been placed and whether the call was answered before it terminated. For example, in some embodiments, the application may not receive call control events, but notifications of the same from the mobile device operating system.

Referring now to stage 204, some embodiments of the automated messaging system application can employ a partial-cloud-based architecture. In these embodiments, the application on the subscriber's device can interact with a cloud-based portion of an automated messaging system as described more fully below. A cloud-based architecture is not required and the application installed on a subscriber's device can be a self-contained application that includes all necessary functionality.

When a subscriber first installs the automated messaging system application (e.g., via a download and/or when subscribers buys a new SIM card from an operator with a pre-embedded application) and power cycles his or her handset, the automated messaging system application can send a registration message to a "cloud" server. As described in more detail below, the cloud server can check the device and determine if it should be blacklisted based on known handset bugs or other limitations (e.g., if a particular handset has a technical limitation that prevents the application from working correctly, that particular handset can be blacklisted), or if the subscriber needs any special settings based on communications with the mobile operator. These settings are then typically sent back to the automated messaging system application on the mobile device from the cloud. This registration can occur at handset start-up, after a phone event such as making a phone call or sending an SMS, and/or at other user-configurable times. In the case where the application is on the SIM card, the registration can occur when the subscriber purchases a new SIM card and places it in his or her mobile device for the first time. In this example, registration can occur either at handset start-up, or after a phone call is made or received, or after an SMS is sent. In some embodiments, the system can determine whether the handset make/model is blacklisted by using the International Mobile Station Equipment Identity (IMEI) and/or Type Allocation Code (TAC, which can be a subset of the IMEI) of the device to determine the handset type.

At stage 206, the automated messaging system application can automatically prompt the subscriber to opt-in and to enter his or her name (e.g., the application can display the message "Welcome to MessageXpress, would you like to participate? If so, please enter your name."). The subscriber's name (and other identifying information) can be stored within the application (e.g., on the SIM or in the mobile device 102/104 itself) so that it can be sent with each message without the user needing to type it each time. The prompt to enter a name (or other identifying information) can occur at handset start-up, via a menu selection if the subscriber selects the service via a SIM Toolkit menu item, upon application launch (in the scenario where the application is on the mobile device), and/or after a phone call. In some embodiments, rather than asking the subscriber if he or she wants to opt-in, the default can be to register the subscriber and then require the user to opt-out if he or she does not want to use the application. If the subscriber does not wish to use the application or service, the service would not automatically prompt the subscriber after missed calls. However, the service could still be re-activated (or disabled) via a menu option, and the subscriber can still receive messages from other users. In some embodiments, the opt-in and/or opt-out process is not initiated until after the automated messaging system application has determined that the mobile device on which it is installed is capable of supporting the automated messaging system. Exemplary processes for determining whether the mobile device is capable of supporting the automated messaging system is described in greater detail below in relation to FIGS. 3 and 4. The opt-in and opt-out process is optional and not required.

In some embodiments, a calling subscriber can also be notified prior to the initial messages being sent that his name will be shared with the called subscriber. Any billing information can also be displayed at this point in time (e.g., if there is a charge associated with using the automated messaging system).

While the foregoing focuses on an embodiment where the caller is automatically prompted to send a message after a missed call, the called party can also be automatically prompted in the same manner. For example, in some embodiments, the called subscriber can also benefit from the use of the automated messaging system application. If the called party has the application installed, the application can detect call control events associated with an incoming call followed by an indication that the call was not answered. This can cause the application in the called device to automatically trigger and prompt the called subscriber to send a message back to the calling subscriber.

Figure 3:
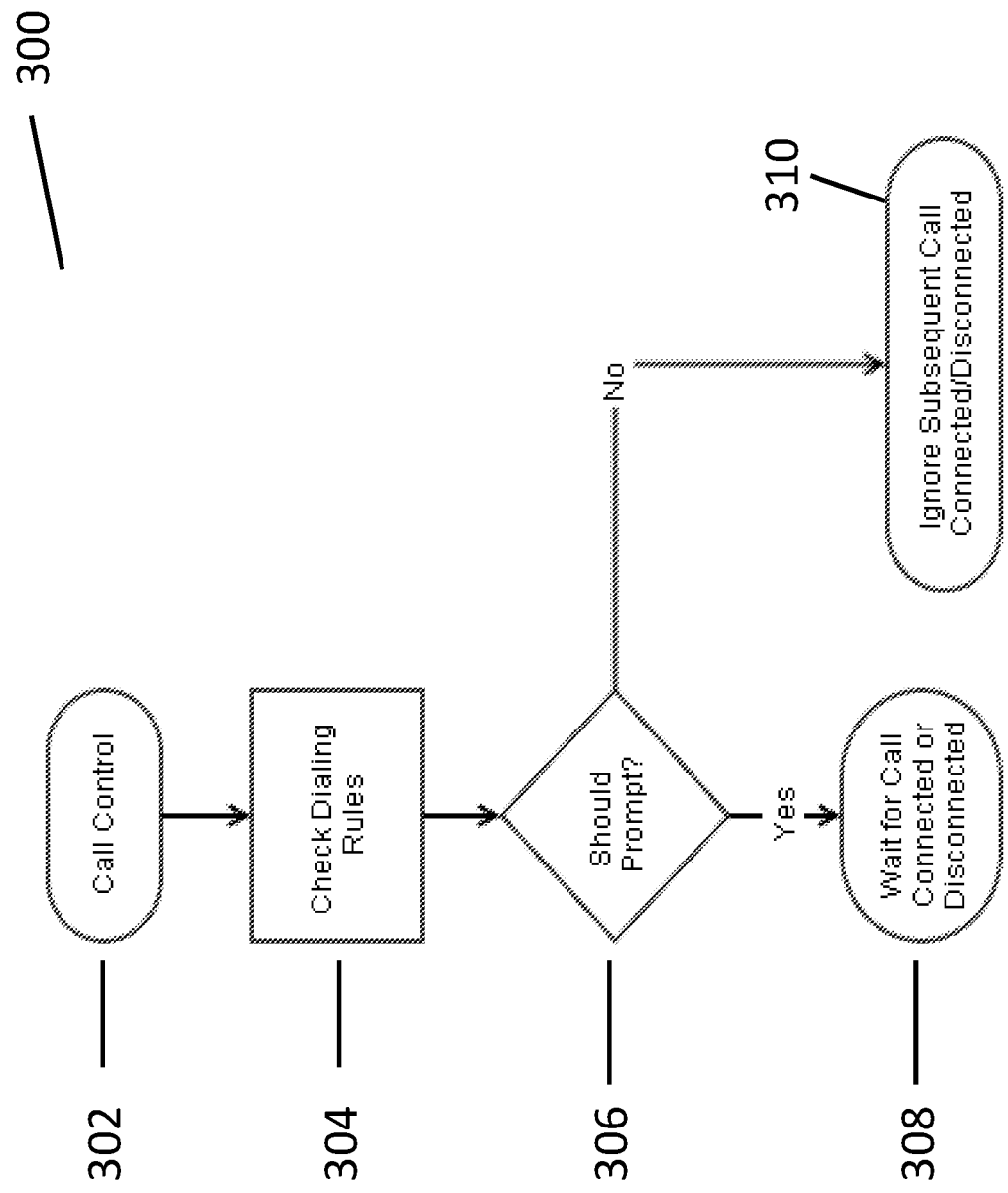
FIG. 3 is a flowchart illustrating an exemplary process for determining whether to trigger an automated messaging system installed on a mobile device.

FIG. 3 is a flowchart illustrating an exemplary process 300 for determining whether to "trigger" (e.g., initiate, turn-on, and/or activate) an automated messaging system application installed on a mobile device. The process 300 is exemplary only and stages may be added, removed, altered, and/or reordered.

At stage 302 ("Call Control"), the automated messaging system application can wait for a Call Control event (e.g., a notification indicating that a call has been initiated). When a Call Control event occurs, the automated messaging system application can be notified, and can also receive the dialed number associated with the call control event. Call Control events are described in greater detail below, and generally signify that a call has been initiated by a calling subscriber (e.g., the calling subscriber has dialed a number), but do not necessarily signify that the call has connected (e.g., that the called subscriber has picked up the call). Call Control events can be detected directly by the automated messaging system application, or be received by the application via a notification from a mobile phone operating system or a SIM Toolkit Framework (STK).

At stage 304 ("Check Dialing Rules"), the automated messaging system application installed on the mobile device can check dialing rules. Dialing rules can be a set of rules and/or conventions regarding mobile subscribers' phone numbers, and can be used to infer information regarding the mobile subscribers' phone numbers. This information can, in some embodiments, affect whether the automated messaging system application initiates or not. For example, in countries where mobile devices have a dedicated area code that is different from fixed land-line numbers, the automated messaging system application can check if the number dialed in the call control event is a mobile number or fixed land-line number (e.g., based on the area code). In some embodiments, if the number is found to be a fixed number, the application can determine not to initiate and can remain silent. This step is not required and can be omitted in some embodiments.

While the above paragraph describes that the application installed on the mobile device checking the dialing rules, this is not required. Rather, the check can be performed by another component, such as a back end server in the network 106, which can then inform the application on the mobile device of the result.

At stage 306 ("Should Prompt"), the automated messaging system application decides whether to trigger or not (e.g., based on whether the called number is a mobile number that can accept messages). If the call is made to a mobile number, then the automated messaging system application can continue to stage 308, where the application triggers and waits for a subsequent "Call Connected" or "Call Disconnected" event. Otherwise (e.g., if the call is not made to a mobile number), then the automated messaging system application can branch to stage 310 where it can remain silent and ignore any subsequent "Call Connected" or "Call Disconnected" events.

Figure 4:
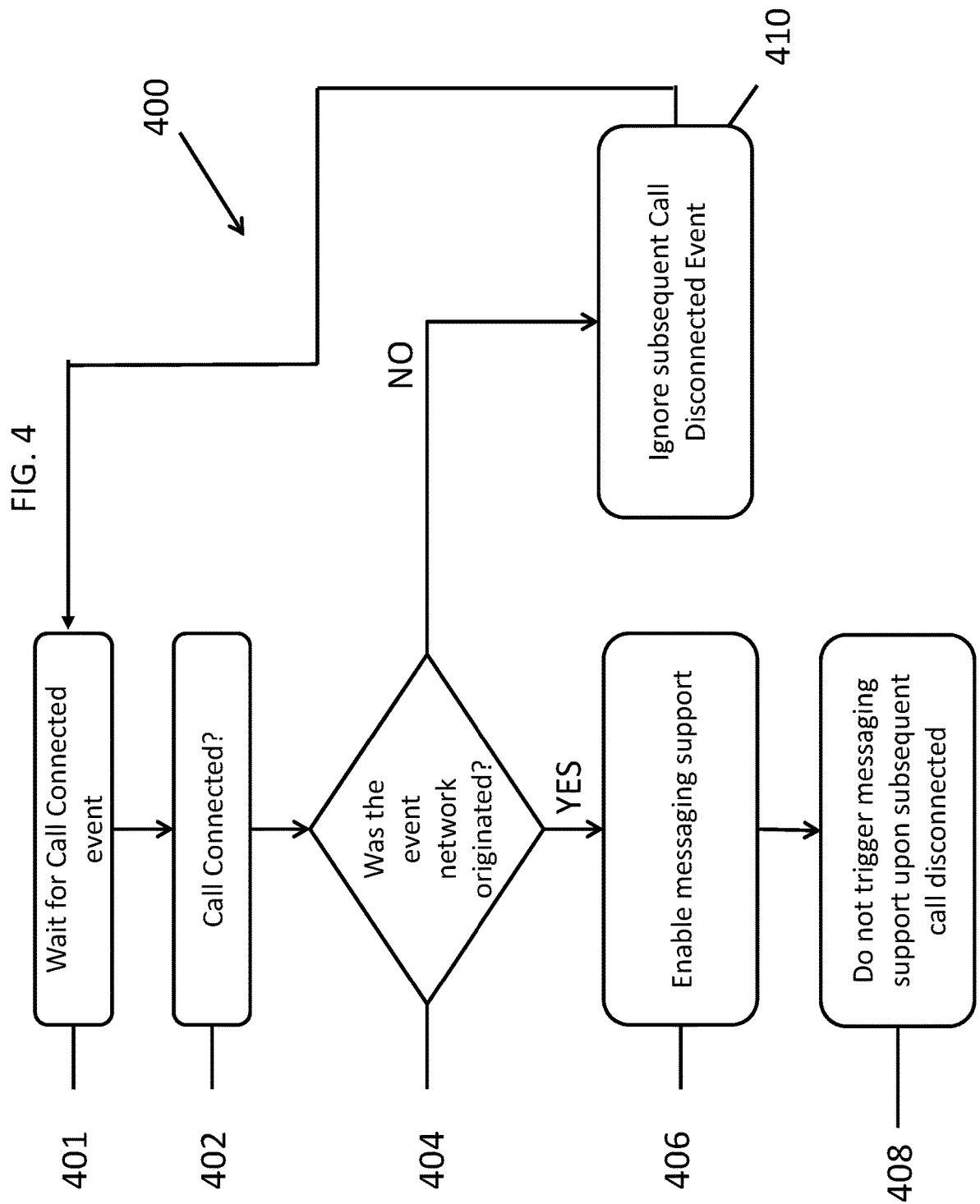
FIG. 4 is a flowchart illustrating an exemplary process by which an automated messaging system application can check whether the mobile device on which it is installed has the capability to understand a Network Originated call connected event.

FIG. 4 is a flowchart illustrating an exemplary process 400 by which the automated messaging system application can check whether the mobile device it is installed on can properly support the application. For example, the messaging system application can check whether the mobile device on which it is installed has the capability to differentiate between network originated call events and mobile device originated call events. By doing so, the messaging system application can differentiate between incoming and outgoing calls (as described more fully below) and only trigger on outgoing calls (if so desired). In some embodiments, if the mobile device is not able to differentiate between networks originated and mobile device originated events, the device may not be compatible with the automated messaging system application, and the application can be fully or partially deactivated. In some embodiments, the process 400 is only performed one time when the application is first activated on a mobile device. The process 400 is exemplary only and stages may be added, removed, altered, and/or reordered.

At stage 401 ("Wait for Call Connected event"), the automated messaging system application on a mobile device can wait for a "Call Connected" event.

At stage 402 ("Call Connected"), the automated messaging system application on a mobile device can receive a "Call Connected" event from the mobile device, along with a dialed number. This event can be the result of, for example, a call to or from the mobile device connecting.

At stage 404 ("Was the event network originated?"), the automated messaging system application on the mobile device can check if the Call Connected event is network originated. If so, the call is an outgoing call because the "Call Connected" event was originated outside of the mobile device and received via the network 106. If the event is not network originated (meaning that the event is mobile device originated, indicating an incoming call), then the automated messaging system can branch to stage 410, at which time the automated messaging system can ignore the subsequent "Call Disconnected" event. After stage 410, the process 400 can continue back to stage 401 and wait for another Call Connected event. This can be because, in some embodiments, the application can be configured to ignore incoming phone calls.

At a general level, in embodiments that only trigger after outgoing calls, this technique can be useful to determine whether the mobile device can differentiate between incoming and outgoing calls (e.g., in devices that lack such a capability, all events will be interpreted as mobile device originated events). Stated differently, until the automated messaging system application actually receives a network-originated event, it has no way of knowing whether the mobile device can differentiate between the two. Thus, in such embodiments, until the automated messaging system application receives a network-originated event, it can continue to remain in an inactive state and not trigger.

At stage 406 ("Enable Messaging Support"), in some embodiments, if the automated messaging system application receives and identifies a network originated Call Connected event, the application can determine that the mobile device on which it is installed can distinguish between network originated and non-network originated call control events, and therefore supports the conditions for an embodiment that only triggers after outgoing calls.

At stage 408 ("Do not trigger . . . "), in some embodiments, the automated messaging system application can remain quiet at the end of this particular Call Connected event and does not trigger. It waits for the next Call Connected event (e.g., the automated messaging system application can be configured to trigger only on the first call after confirming that the device is capable of handling network originated call connected events).

Figure 5A:
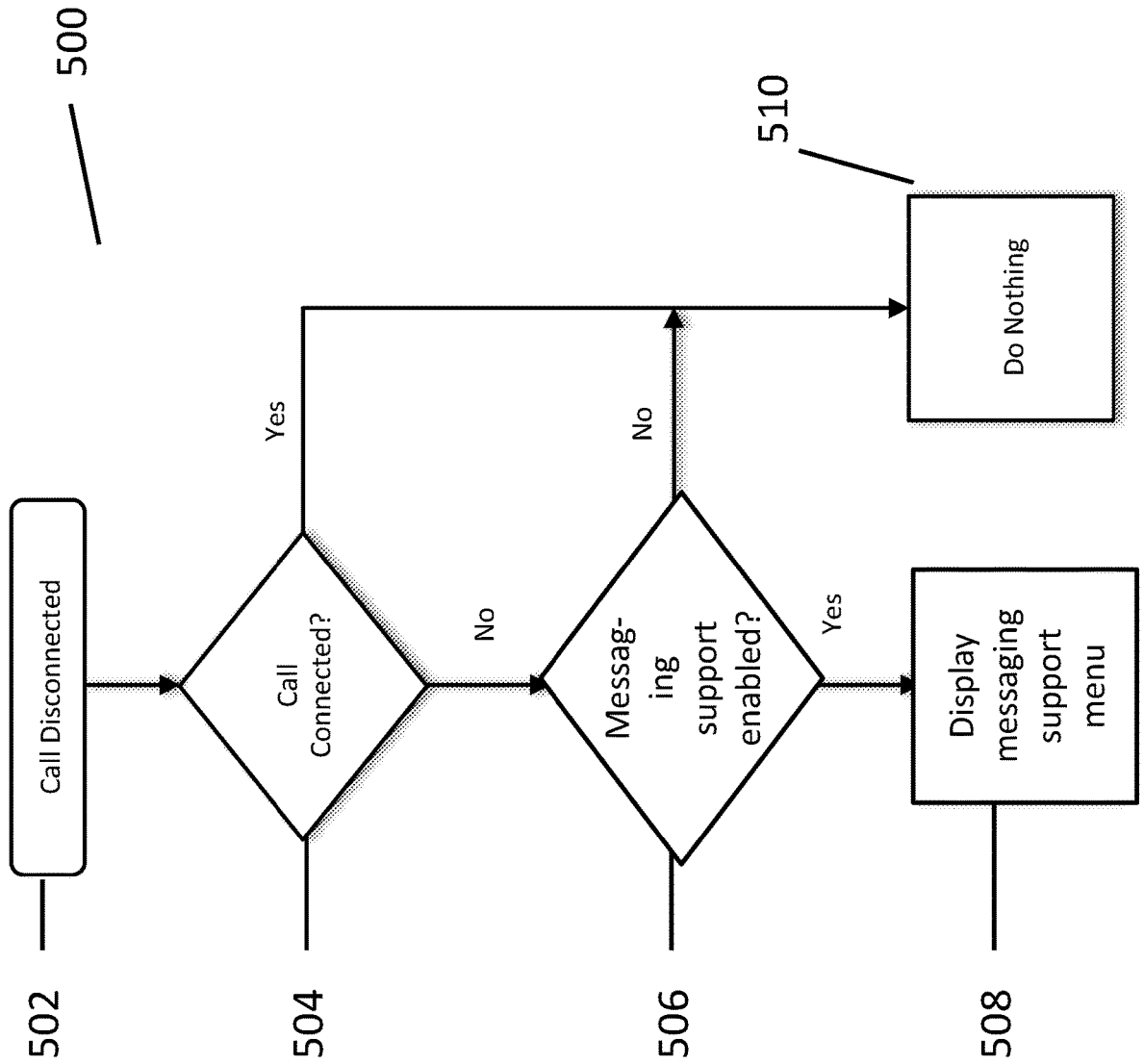
FIG. 5A is a flowchart illustrating an exemplary process by which an automated messaging system application can determine whether or not to display a messaging menu after a "Call Disconnected" event is received.

FIG. 5A is a flowchart depicting an exemplary process 500 by which the automated messaging system application can determine whether or not to automatically display a messaging menu. Process 500 can use call events, such as a "Call Disconnected" event, and the presence or absence of a "Call Connected" event, to infer whether a call was a missed call, and whether to display the messaging menu. The process 500 is exemplary only and stages may be added, removed, altered, and/or reordered.

At stage 502, ("Call Disconnected"), the automated messaging system application can receive a "Call Disconnected" event from the mobile device. This type of event can indicate that a connected call between two mobile devices has terminated and/or that an attempt to connect a call between two mobile devices has failed.

At stage 504 ("Call Connected?"), the automated messaging system application can check if the call had previously been connected before the Call Disconnected event was received. For example, the automated messaging system can check its memory and/or the memory of the mobile device on which it is installed, whether or not a "Call Connected" event was received prior to the "Call Disconnected" event, and whether the two events pertain to the same mobile number. If the call was connected, the automated messaging system can branch to stage 510 and remain silent. If the call was not connected, then the automated messaging system application can continue to stage 506. Additionally, during this stage (or another stage), the automated messaging system application can determine whether the Call Disconnected event was network originated or not. In embodiments that only trigger after outgoing calls, the process 500 can branch to stage 510 when the Call Disconnected event was not network originated.

In some cases, when a calling subscriber calls a subscriber who is not available, the calling subscriber can hear a message from the network operator. This audible message can state, for instance, that "the person you are calling now is busy," "the phone number you have dialed is not available," or some other message. In these cases, the fact that the calling subscriber hears a message from the network operator does not necessarily indicate that the call was "connected," and that a "Call Connected" event was generated and received. Since no "Call Connected" event is typically received for these types of network operator messages, the process 500 can continue to stage 506 upon receiving such a message.

At stage 506 ("Messaging support enabled?"), the automated messaging system application can check if messaging support is enabled for this mobile device. Messaging support can be enabled, for example, using the process discussed above in relation to FIG. 4. If messaging support for this mobile device is enabled, the process 500 proceeds to stage 508. Otherwise, the automated messaging system application branches to stage 510 and can remain silent.

At stage 508 ("Display Messaging Support Menu"), the automated messaging system application can automatically trigger and cause the display of its menu to the subscriber on the display of the mobile device. That is, the menu can be displayed without any further action by the user, solely as a result of receiving the Call Disconnected event without receiving a Call Connected event. As discussed above, the menu can give the calling subscriber a list of options for messaging the called subscriber, for example:

Send A Message:
Call me back
I will be late
I am waiting
Where are you?
New message
Customize (e.g., mobile subscribers can change these messages and enter their own text)

At this point, the user can select one of the displayed menu options (e.g., "Call me back"). After making a selection, the automated messaging system application can cause the mobile device to generate and send a message (e.g., via the network 106). The connection to the network 106 can be accomplished in many different ways and the messages can be transported using various methods (e.g., SMS, MMS, USSD, IMESSAGE®, FACEBOOK® message, TWEET®, e-mails, and/or data communication channels). In some embodiments, the automated messaging system application can supplement (or cause the mobile device or network to do so) the message with additional information such as the caller's name, phone number, date/time, and other supplementary information.

As described in further detail below, the user can customize one or more of these displayed menu options. Once customized or personalized, these choices can automatically appear after any subsequent missed call. For example, a user could change "Where are you?" to "Have a great day!" After every missed call, the "Have a great day" option can automatically appear as a selection. While some or all of the menu options may be customizable, some or all of the menu options can also be locked out by a system administrator of the automated messaging system application so that users can no longer customize them. For example, a service administrator may wish to limit personalization of some of the menu items.

The user can also create a message to be displayed along with the default menu options. For example, the user could create a new message saying "I can't make it" by selecting the "New message" option from the above menu. Once created, this new message can automatically appear after any subsequent missed call.

The displayed menu options and their associated messages can also vary depending on the date. For example, the automated messaging system application can be configured to add the message "Happy New Year" to the list of menu options if the current date is between December 26 and January 15. Once the current date is no longer in the date range December 26 to January 15, the list of menu options presented to the user can revert to the default set of options. The current time and date can be collected remotely from a remote server, from the operating system of the mobile device, or from incoming messages targeted to the mobile device.

Figure 5B:
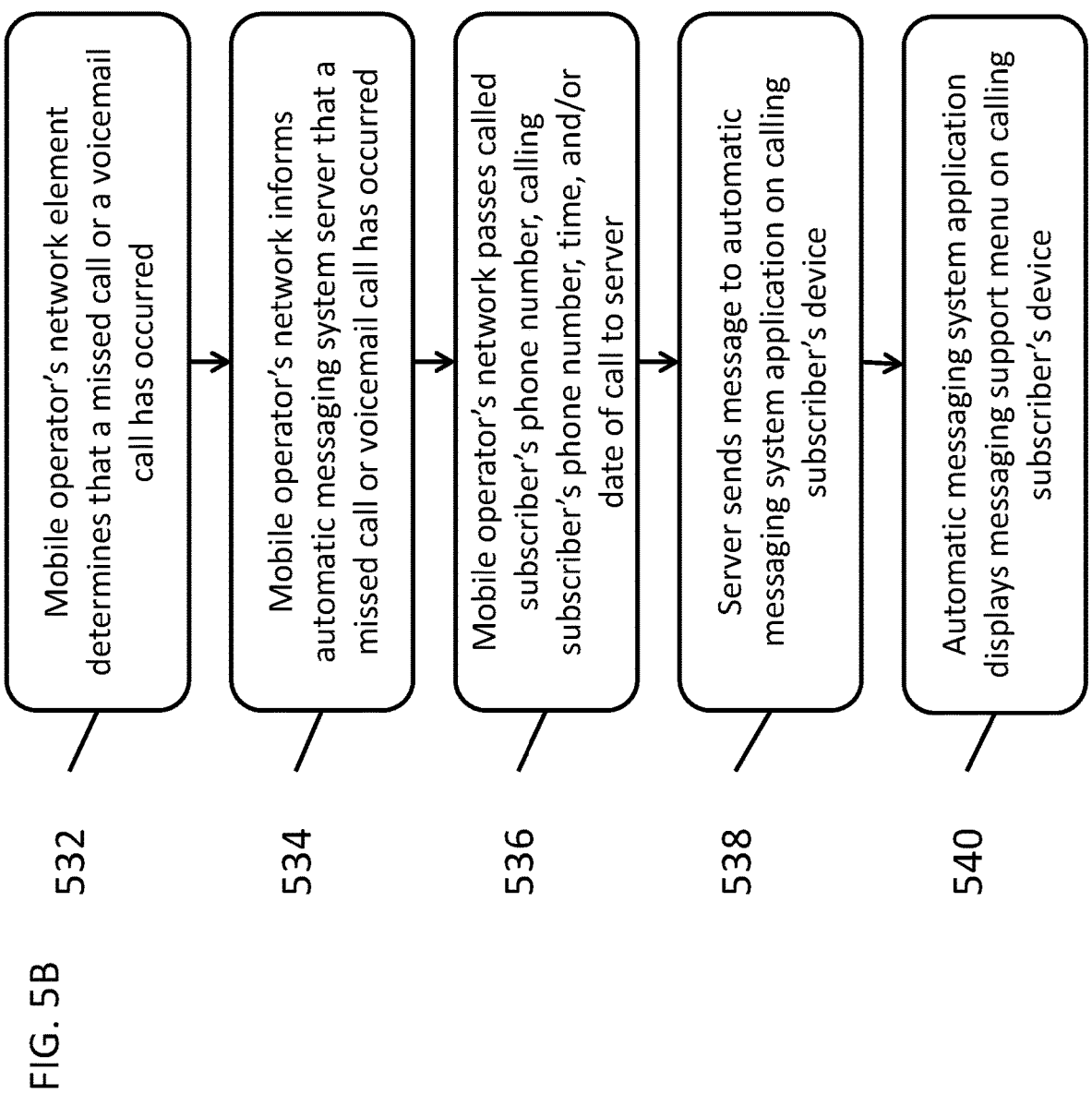
FIG. 5B is a flowchart illustrating an exemplary process by which an automated messaging system application can determine whether or not to display a messaging menu using information provided by the mobile operator network.

FIG. 5B is a flowchart depicting another exemplary process 530 by which the automated messaging system application can determine whether or not to automatically display a messaging menu. Process 530 can use one or more elements or devices within the mobile operator's network to determine whether a call is a missed call. The process 530 is exemplary only and stages may be added, removed, altered, and/or removed. This process can apply, for example, when a call connects to voicemail (which may fool the calling device into thinking that the call connected).

At stage 532, a network element in the mobile operator's network can determine that a call has disconnected without connecting to the called subscriber, e.g., that a missed call has occurred. For example, a switch in the mobile operator's network, a Home Location Register (HLR), a sub-switch, a Mobile Switching Center (MSC), a billing center (BC), a voice mail system (VMS), or any other network element in the mobile operator's network that enables call completion and missed call detection can be used to detect a missed call. An example of this would be a component within Verizon Wireless' network informing the mobile handset that a missed call occurred.

In some cases, depending on the telecommunications standard being utilized by the mobile operator's network, a voicemail call (e.g., a call in which the calling subscriber reaches the called subscriber's voicemail, but does not speak directly to the called subscriber) may not be categorized as a "missed call." This may be because a voicemail call can generate a "Call Connected" event when the called subscriber reaches the called subscriber's voicemail, even though the two subscribers never spoke directly. In such cases, certain network elements configured to detect "missed calls" may not be able to distinguish between a "voicemail call" and a regular phone call in which two subscribers speak directly. In such cases, a mobile operator's network element, such as the voicemail system, can detect that a "voicemail call" has occurred and classify it as a "missed call." That is, for example, a "voicemail call" can be considered a type of missed call. Both can be considered actionable calls in that they can both be used to trigger the automatic messaging system application on the calling subscriber's mobile device to display its messaging menu.

At stage 534, the mobile operator's network can inform an automatic messaging system server (e.g., a cloud server) that a missed call or a voicemail call has occurred. This can be done via an Application Program Interface (API), or other notification method. The mobile operator network can also inform the mobile device directly, without involving the automatic messaging system server.

At stage 536, the mobile operator's network can pass the called subscriber's phone number, the calling subscriber's phone number, the time of the missed call, and/or the date of the call to the automatic messaging system server (and/or directly to the mobile device). This can also be done via an API.

At stage 538, the automatic messaging system server can send a message to the automatic messaging system application on the calling subscriber's device. This message can take many forms and can include, for example, a binary SMS message, a USSD command, an SMS that is not displayed to the user (e.g., a class 2 SMS message), or a specialized data packet. This message can instruct the automatic messaging system application on the calling subscriber's device to prompt the calling subscriber with messaging menu. In embodiments where the a messaging system server is not used, the mobile operator network can send a notification directly to the mobile device (including the applications installed therein) using any of the foregoing messaging types.

At stage 540, in response to the message received from the automatic messaging system server indicating that a missed call (including a voicemail call) occurred, the automatic messaging system application on the calling subscriber's device can automatically display its messaging menu. This menu (and the process that follows) can be similar to the menu described above in relation to stage 508 in FIG. 5A.

Figure 6A:
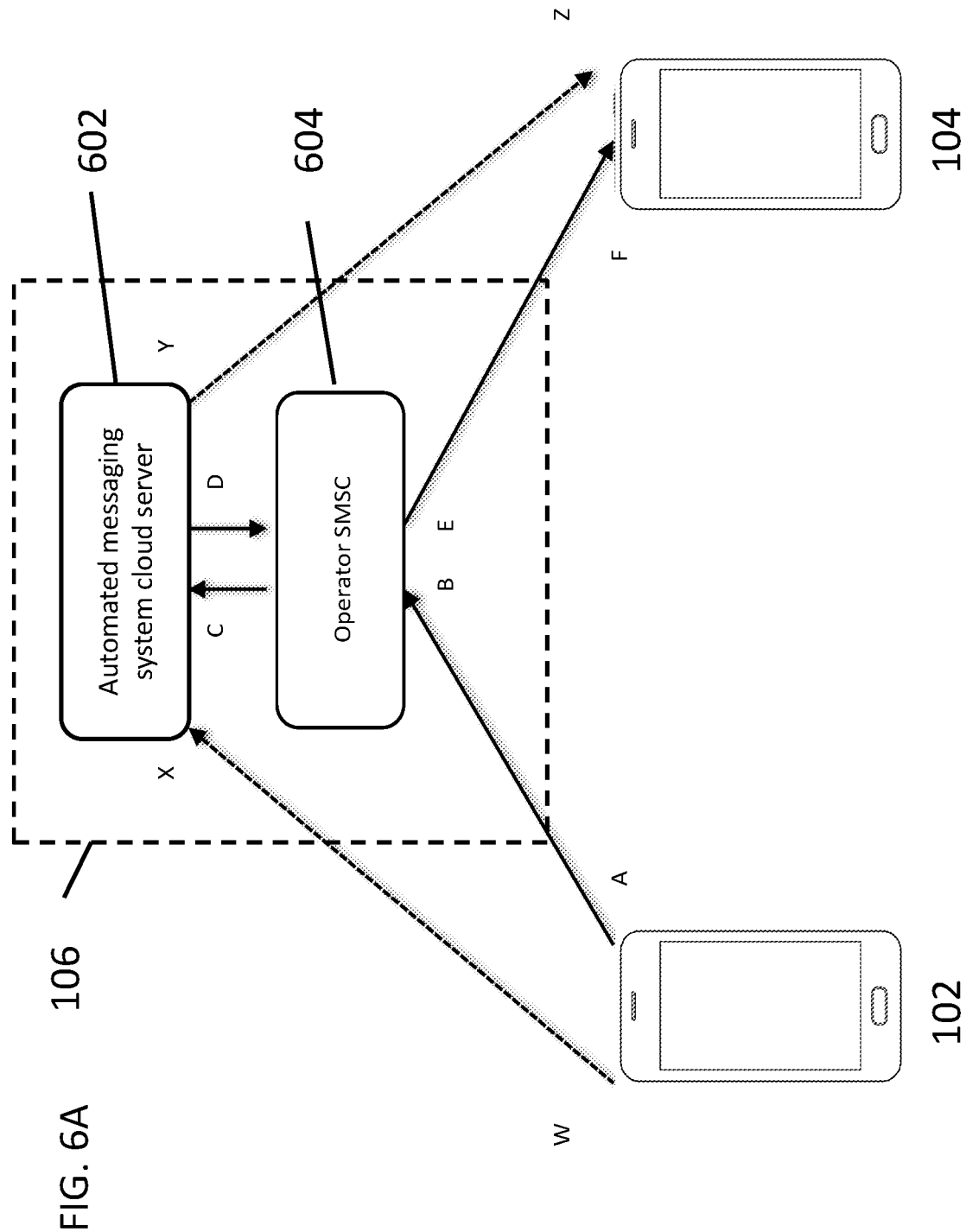
FIG. 6A is a logical block diagram illustrating components and data flows of the exemplary mobile phone system of FIG. 1 in greater detail.

FIG. 6A is a logical block diagram that illustrates exemplary components and data flows of the mobile phone system of FIG. 1 in greater detail. FIG. 6A includes the first subscriber's mobile device 102, the second subscriber's mobile device 104, and the network 106. In this embodiment, the network 106 further includes two subcomponents: automated messaging system cloud server 602 and operator short message service center ("SMSC") 604. Other embodiments are possible.

The automated messaging system cloud server 602 can be configured to interact with the automated messaging system applications installed on one or both of mobile devices 102 and 104. For example, a message sent from mobile device 102 for mobile device 104 can first be routed through the automated messaging system cloud server 602. The cloud server 602 can maintain a list of addresses and/or delivery channels associated with different mobile devices. When cloud server 602 receives the message from mobile device 102, cloud server 602 can look up a preferred delivery mechanism and/or address for mobile device 104, and forward the message to the appropriate delivery mechanism and/or address. In one embodiment, for example, cloud server 602 can determine that mobile device 104 prefers to receive messages in SMS format, IMESSAGE® format, FACEBOOK® post format, email format, TWEET® format, or other formats. In some embodiments, the list can be kept to reflect a hierarchical preferred order. Cloud server 602 can also determine when a message sent to mobile device 104 needs to be reformatted in order to display correctly (e.g., because mobile device 104 is of a different device type or employs a different mobile device operating system than the sending mobile device 102). In such cases, cloud server 602 can reformat the message so that it will display correctly on mobile device 104. For example, the cloud server 602 can reformat an IMESSAGE® received from the mobile device 102 into an ordinary text message (e.g., where the mobile device 102 is an APPLE® device and the mobile device 104 is a SAMSUNG® device).

Cloud server 602 can also be configured to remotely change the pre-programmed messages stored on mobile devices 102 and 104. For example, an administrator at cloud server 602 can determine to change the pre-programmed message "I will be late" to "I am coming." The change to the pre-programmed message can include changing the way the message appears to the calling subscriber on the menu (e.g., changing the phrase "I will be late" to "I will be coming"), or it can merely change the phrase associated with a menu item while leaving the menu item unchanged (e.g., leaving the phrase "I will be late" unchanged as it appears in the menu to the calling subscriber, but changing the contents of the message sent to the called subscriber if the calling subscriber selects the "I will be late" option. For instance, whereas the message sent to the called subscriber might have previously stated "I will be late," it might now say "I have been delayed."). The administrator at cloud server 602 can delete messages (e.g., removing the pre-programmed message "Where are you?" from the list of options presented), or add new messages (e.g., adding the new message "I can't make it."). In some embodiments, cloud server 602 can change and/or add messages that are appropriate to certain times of the year, such as "Happy Holidays," "Merry Christmas," or "Happy New Year." Cloud server 602 can also add, change, or delete settings on the automatic messaging system applications installed on subscriber's phones that cause those applications to display certain messages when the current date falls within certain date ranges. For example, where the automatic messaging system applications might originally have presented subscribers with the menu option "Happy Holidays" when the current date is between December 20 and December 31, cloud server can remotely and automatically change both the associated date range (e.g., changing the range to December 21 through December 25), as well as the associated menu option (e.g., changing "Happy Holidays" to "Merry Christmas"). This change does not have to occur within the specified date range, but can happen at any time.

In some embodiments, the changes can be pushed to mobile devices 102 and 104 automatically without any input required from the users of mobile devices 102 and 104. These changes can be communicated to mobile devices 102 and 104 via messages of different formats, such as binary SMS format, USSD, IMESSAGE®, MMS, or other types of data packets. In some embodiments, mobile devices 102 and 104 can be configured to notify users of the mobile devices 102 and 104 that a change is being pushed to those devices from cloud server 602. In some embodiments, mobile devices 102 and 104 can ask their users for permission to change its pre-programmed messages to match new pre-programmed messages received from cloud server 602. The cloud server 602 can also be configured to supplement the messages is handles with additional information such as additional content (e.g., adding a phone number to the message), adding a timestamp, and/or adding a caller's name.

The operator SMSC 604 can be responsible for delivering voice and data messages between the mobile devices 102 and 104. In some embodiments, operator SMSC 604 can receive messages from mobile device 102 and forward those messages to cloud server 602. Operator SMSC 604 can also receive messages from cloud server 602 and forward those messages to mobile device 104.

Next is one example of how the system shown in FIG. 6A can operate, although other configurations are possible. While the following discussion focuses on SMS and MMS messages, the disclosed subject matter is not limited to this and other message types can be used.

As described above, after the first subscriber (e.g., mobile device 102) calls the second subscriber (e.g., mobile device 104), and the second subscriber does not answer the call, the first subscriber can automatically be presented with the option to send an SMS or MMS message to the second subscriber. When the first subscriber chooses to send a message to the second subscriber after a missed call, the message can follow the following exemplary route:

- The automated messaging system application within the mobile device 102 can forward a message (Reference A) to a designated short code at Operator's SMSC 604. This can occur, for example, over a cellular, WiFi, or hardwired network connection. The content of the message can be one of the predetermined messages presented to the first subscriber and/or a custom message. In some embodiments, the application within the mobile device 102 can be configured to supplement the chosen message with additional information (e.g., if the user chooses "call me back" as the message, the application can supplement this with the name of the first subscriber, the date/time, and a callback number).
- At Reference B the message is received at the operator SMSC 604. The SMSC 604 can be operated by, for example, the cellular network operator (e.g., Verizon).
- The operator SMSC 604 can forward the incoming message to automated messaging system cloud server 602 (Reference C).
- Automated messaging system cloud server 602 can transform the message by reformatting it to display properly on the called subscriber's mobile device 104, and can forward the reformatted message back to the operator SMSC 604 (Reference D). In some embodiments, the automated messaging system cloud server 602 can also be configured to supplement the message with additional content.
- The operator SMSC 604 can forward the (re)formatted message to the mobile device 104 (Reference E). The SMSC 604 can forward the message as, for example, an SMS message.
- At Reference F, the mobile device 104 receives the automated messaging system message and processes it. Processing can include, for example, notifying the second subscriber that a message has been received and displaying the message to the second subscriber. In some embodiments this can be handled by an automated messaging system application installed in the mobile device 104 and/or by the mobile device 104 itself. For example, if there is no automated messaging system application in the mobile device 104, the mobile device 104 can process the message as an ordinary text message.

In embodiments of the automated messaging system that use data networks (e.g., 3G, LTE networks) rather than SMS or MMS messages, the following connectivity structure and dataflows can be used. That is, some embodiments can rely solely on a data network connection rather the supplementary services provided by the mobile operator. For example, by sending a message over a data connection (e.g., an IMESSAGE® or e-mail), subscribers can avoid using up their allotted SMS messages.

In such an embodiment, when the first subscriber (e.g., the calling subscriber on the mobile device 102) sends an automated messaging system message to the second subscriber (e.g., the called subscriber on the mobile device 104), the message can follow the following route:

- The automated messaging system application within mobile device 102 can send the message directly to the automated messaging system cloud server 602 (e.g., by sending the message to an IP address corresponding to the automated messaging system cloud server 602), thereby bypassing the operator SMSC 604 (Reference W). As noted above, the automated messaging system application can also supplement the information contained in the message.
- At Reference X, the automated messaging system cloud server 602 receives the message.
- The automated messaging system cloud server 602 can transform the message by reformatting it to display properly on the called subscriber's mobile device 104, and can forward the formatted message to the destination mobile device 104 (Reference Y). In some embodiments, the automated messaging system cloud server 602 can also be configured to supplement the message with additional content.
- At Reference Z, the mobile device 104 receives the automated messaging system message from the cloud server 602 and processes it. Processing can include, for example, notifying the second subscriber that a message has been received and displaying the message to the second subscriber. In some embodiments this can be handled by an automated messaging system application installed in the mobile device 104 and/or by the mobile device 104 itself. For example, if there is no automated messaging system application in the mobile device 104, the mobile device 104 can process the message as an ordinary IMESSAGE® or e-mail.

In some embodiments of the system shown in FIG. 6A, one or more of the components therein can be configured to determine (or be informed) whether the called subscriber also has the automated messaging system application installed. If so, messages sent to the called subscriber's mobile device can be formatted/enhanced to provide additional features and/or functionality to the calling and called subscribers. For example, on the one hand, if no automated messaging system application is installed on the called subscriber's phone, the message delivered can be formatted (and ultimately displayed) as an ordinary text message. On the other hand, if the automated messaging system application is installed on the called subscriber's device, then the application can receive enhanced messages that cause enhanced functionality on the called subscriber's device (e.g., special presentation of the message, a sound being played, a special prompt, read receipt being sent to the calling subscriber, automatic reply message prompts being presented to the called subscriber, etc.).

For example, the automated messaging system server can check to determine if the called subscriber also has the automated messaging system application installed and enabled on his or her phone. If the automated messaging system application is installed and enabled by the called subscriber, then the automated messaging system server may optionally format and/or enhance the message sent to the called subscriber in such a manner that the application on the called subscriber's mobile device can interpret the message and perform a set of various configurable functions such as playing an alert tone, displaying the message, forwarding a notification to another phone number, or returning the message to the automated messaging system server for re-formatting if it is received in a user interface language that the called subscriber has not designated as a default. If the called subscriber has the automated messaging system application installed and enabled on his mobile device, the server may also format and/or enhance the message sent to the called subscriber in a manner that is related to the device type of the called subscriber. Users with smartphone devices may receive enhanced messages with more content, or the messages may be sent as MMS messages, emails, or other data-enhanced messages.

The above embodiments are exemplary and other configurations are possible. For example, while this application discusses "client," "cloud," and "server" functionality, some of all of this functionality can be combined into a single application (e.g., located on a mobile device, located only in the cloud, and/or only located on a server). Additionally, while the above descriptions focus on the calling subscriber sending a message to the called subscriber, the reverse is also possible. For example, after missing a call, the called subscriber can be automatically presented with the same options described above for the calling subscriber.

Protocols, platforms, and hardware that can be used to implement each of the exemplary processes discussed above in relation to FIGS. 1-6 will now be described in greater detail.

During calls between mobile devices, the mobile device can register various events relating to the status of the call. For example, the following events are possible:

A phone number is dialed (e.g., which can cause a "Call Control" event)

The call is connected (e.g., which can cause a "Call Connected" event)

The call is disconnected (e.g., which can cause a "Call Disconnected" event)

As described more fully below, these events can be network originated or mobile originated. Additionally, each of these events can include supplemental information such as the dialed phone number and/or timestamp information.

Which events are registered can vary depending on what happens during a particular call. For example, in a typical mobile call from a calling subscriber to a called subscriber where the called subscriber answers the call, the operating system of the calling subscriber's mobile device can register the following events:

A phone number is dialed (e.g., which can cause a "Call Control" event)

The call is connected (e.g., which can cause a "Call Connected" event)

The call is disconnected (e.g., which can cause a "Call Disconnected" event)

However, if a calling subscriber attempts to dial a called subscriber, but the called subscriber does not pick up and the call attempt terminates (e.g., because the called subscriber is busy), the operating system of the calling subscriber's mobile device can register the following events:

A phone number is dialed (e.g., which can cause a "Call Control" event)

The call is disconnected (e.g., which can cause a "Call Disconnected" event).

Therefore, in some embodiments, the mobile device of a calling subscriber can distinguish between a regular phone call that successfully connects and an unsuccessful attempt by the calling subscriber to connect with a called subscriber by determining whether or not a "Call Connected" event occurred between the "Call Control" event and the "Call Disconnected" event. While the above description focuses on "Call Control," "Call Connected," and "Call Disconnected" events, these events may go by other names in when implemented in a cellular network. For example, if the relevant information (e.g., a calling be dialed, connecting, or disconnecting) can be inferred from an occurrence in the system, it can be considered one of the Call Control, Call Connected, and/or Call Disconnected events. Exemplary embodiments of these events are defined by, for example, the standards provided by 3GPP.

As noted above, some embodiments of the automated messaging system use an application that is installed on a subscriber's mobile device's operating system. In such embodiments, the automated messaging system application typically starts (e.g., launches or activates) when the subscriber dials a number (e.g., after a "Call Control" event). In some embodiments (e.g., if the application is part of the mobile device operating system), the automated messaging system application can register two events: 1) outgoing call event with number information and status (connected, rejected, etc.), and 2) call disconnected event (e.g., so that the automated messaging system application is notified when these events occur). The automated messaging system application can collect the dialed number from the event and can save it for future use. At this point, the automated messaging system application can become active and can wait for the next event to happen. The mechanism by which the automated messaging system application is notified of the call events can vary. For example, rather than registering certain events directly, the application can be notified of call events by the operating system and/or other mechanisms. The automated messaging systems and methods disclosed herein can work across different operating systems in different mobile devices. The disclosed systems and methods can work in conjunction with an operating system of a mobile device, but are not dependent on the type of operating system. Therefore, in some embodiments, calling device can comprise a first operating system and a called device can comprise a second operating system.

Thus, in an exemplary embodiment, the calling subscriber can trigger a Call Control event by dialing a telephone number. In embodiments where the automated messaging system application is installed on a mobile device that uses a SIM card, the Call Control event can pass the dialed number to a SIM Toolkit Framework (STK). The STK can maintain a list of one or more applications that are registered to receive notifications of Call Control events from the STK. The automated messaging system application can be registered as one of those applications on the list. Therefore, when the STK receives the Call Control event and the dialed number, the STK can forward that information to the automated messaging system application.

If the call is connected, the mobile device typically issues a "Call Connected" event and informs the automated messaging system application (either directly or indirectly through, for example, the STK, as described above). If the "Call Connected" event is the event issued after the "Call Control" event (e.g., the event associated with dialing a number), then the automated messaging system application can determine that this is a regular phone call that successfully connected as opposed to an unsuccessful connection attempt. In such situations, the automated messaging system application can terminate.

If the call is disconnected without a call connection, the mobile device typically issues the "Call Disconnected" event after the Call Control event and informs the automated messaging system application (either directly or indirectly). This will typically cause the automated messaging system application to automatically trigger a screen prompt to the caller when this happens (e.g., to prompt the caller to send a message).

The automated messaging system application can differentiate between mobile equipment originated events and network originated events. For example, if a call from a calling subscriber to a called subscriber is connected, the calling subscriber typically receives the corresponding Call Connected event from the network, rather than having it originate from the calling subscriber's device itself. Thus, by differentiating between mobile equipment originated events and network originated events, the automated messaging system application can determine whether the call is an incoming call or an outgoing call. In systems that support network originated Call Control events, the automated messaging system application can also differentiate between incoming and outgoing calls by determining whether the Call Control event was mobile equipment Originated or network originated. The application can also differentiate between incoming and outgoing calls in other ways as well.

The events (or handlers) can be implemented differently depending on the operating system of a mobile device. For example, the abovementioned events can be implemented in a way that one event can be responsible for sending the number dialed and a second, separate event can be responsible for informing about the state of the call (e.g., RINGING, IDLE, OFF HOOK, etc.). By changing the sequence of different states and events (or handlers), the automated messaging system application can identify incoming, outgoing, and connected calls and then decide to trigger after disconnected calls without a connection.

The events described in this patent application are based upon current GSM and 3GPP mobile standards. These standards are continually enhanced as new technologies become available. A new standard defining a "Missed Call" event can also be defined, such that it will no longer be necessary to track the sequence of "Call Control" events, "Call Connected" events and "Call Disconnected" events to infer whether a missed call has occurred. If a Missed Call event is defined, the mobile device can simply be configured to detect when such a Missed Call event is received, and trigger its messaging menu accordingly. All other processes described herein could still apply in this scenario.

For embodiments where the application messaging system application is installed on a SIM system, the automated messaging system application can be registered with the SIM Tool Kit Framework (STK) to receive "Call Control", "Call Connected" and "Call Disconnected" events. STK informs the automated messaging system application each time these events occur. The automated messaging system application can start with the Call Control event that signals a dialing event. If the automated messaging system application receives the Call Disconnected event without receiving the Call Connected event, then the application can automatically trigger a prompt on the screen on the calling party's phone.

In some embodiments, the operation of the application can be thought of as follows:

If a Call Control event followed by a Call Connected event is received, then do not trigger the application.

If a Call Control event and a Call Disconnected event is received, then automatically trigger the application and ask the user whether he or she wants to send a message to the called party.

When a Call Disconnected event happens without a Call Connected event, this condition can automatically trigger the application and prompt the user to send a message to the called party.

While the description above discusses the automated messaging system application receiving certain call control events, the application does not need to receive the actual event itself. For example, in some embodiments, the mobile device operating system can receive the call events, and rename/repackage the event before providing it to the application.

Whether the automated messaging system application is on the device Operating System or embedded to the SIM card, if a Call Control event followed by a Call Disconnected event is received without an intervening Call Connected event, the application can automatically trigger a prompt on the screen of the mobile device of the calling subscriber.

FIG. 6B is a flowchart depicting another exemplary process 642 by which the automated messaging system application intercepts the message and prepares potential responses. In some embodiments, the automated messaging system intercepts the message at the server level. Process 642 is exemplary and stages may be added, removed, altered, and/or reordered. In some embodiments, process 642 takes place in 602, the automated messaging system cloud server, as depicted in FIG. 6A. At stage 606, the automated messaging system cloud server detects an incoming message and registers a destination address. Next, at stage 608, the application will determine whether the target destination, mobile device 104, i.e. the message receiver, has the application installed. If no, then process 642 proceeds to stage 640 and sends the information as a text message. If yes, then at stage 610 the cloud server reads the content of the incoming message. Next, the server will recall a list of predictive message responses that correspond directly to the message that was received. For example, the list shown in FIG. 7D are potential responses to the message the incoming message shown in FIG. 7C. At stage 614, both the incoming message and potential responses (should subscriber using mobile device 104 choose to respond when given the option) are combined together. This package is then sent to the operator SMSC for succeeding steps to be sent to the destination.

Figure 6C:
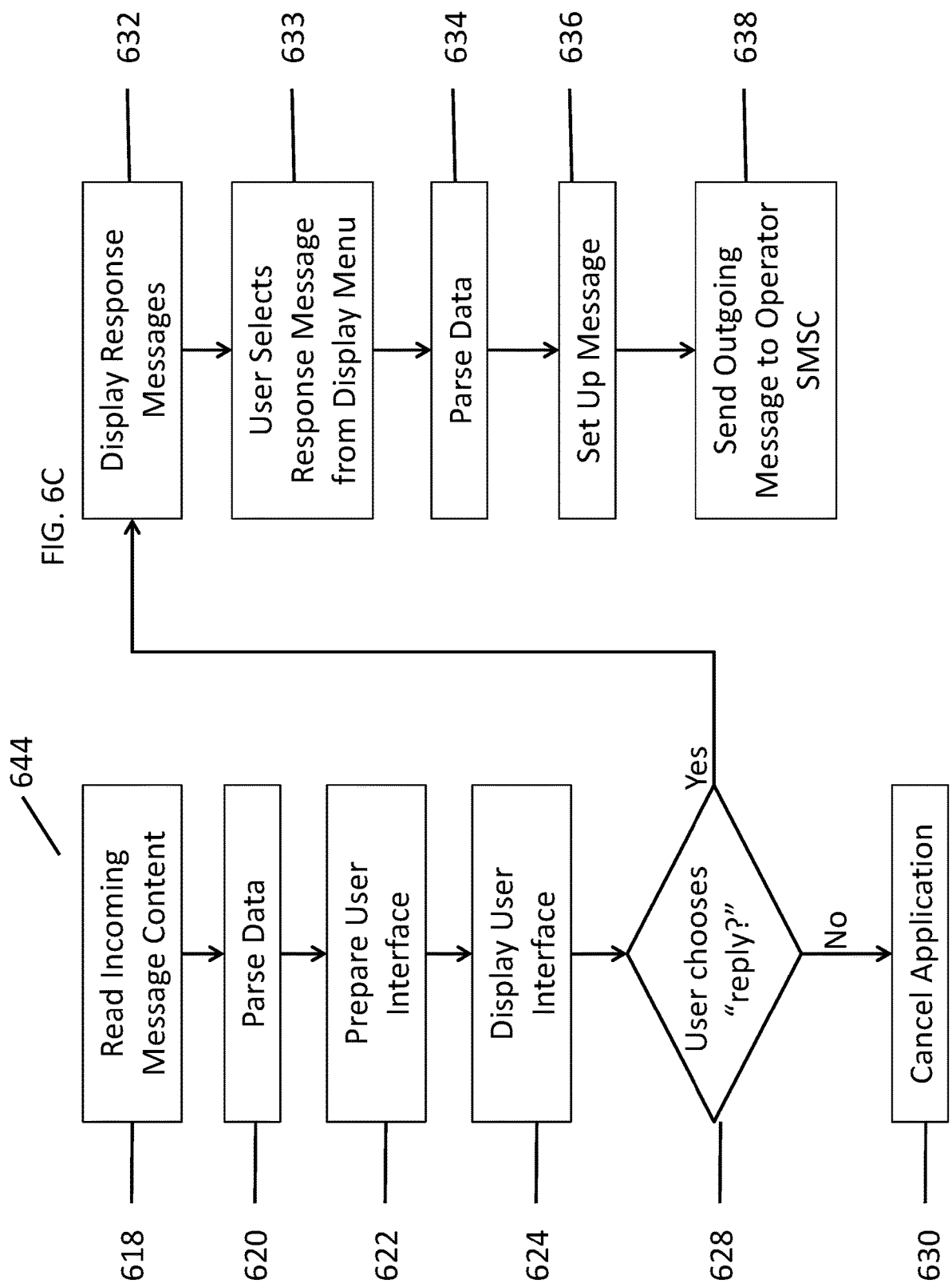
FIG. 6C is a flowchart illustrating the process by which a mobile device picks up an incoming message and sends a message back to the Operator SMSC.

FIG. 6C is a flowchart depicting the specific process 644 that takes place at Reference F in FIG. 6A. At stage 618, the operating system of mobile device 104 (as shown in FIG. 6A) will receive the message sent from mobile device 102 (as shown in FIG. 6A) and send it to the automated messaging system application installed on mobile device 104 for recognition and processing. In some embodiments, the application is triggered due to the specific formatting of the enclosed SMS and the data of the message contents are then parsed. For example, in some embodiments, the message is a binary SMS or a Class II formatted MT SMS. In other embodiments, the message does not have special formatting that triggers the application. At stage 622, the contents of the user interface (UI) are prepared on the server. At stage 624, the user interface is displayed on mobile device 104, as seen in FIG. 7C, in such a way that a "Reply?" option is clickable by a button or by touch screen. At stage 628, the user can follow through with one of two options. In one case, the user can choose not to reply, thus prompting the cancellation of the application, stage 630. In the other case, the user can choose to select the clickable "Reply?" option. If the user selects "Reply?,", at stage 632, the user interface is displayed on mobile device 104 as a menu with a plurality of selectable menu items in such a way that each predictive messaging option is clickable by touchscreen or an assigned corresponding button. The selectable menu items can be text messages, a music file, a picture, a video, or another multimedia file. An example of a menu display is shown in FIG. 7D. Although the menu of FIG. 7D only includes text messages, the menu can comprise selectable items including non-text message options. At stage 633, the user chooses one of the displayed potential response options. The data of the selected menu item (that corresponds to a stored phrase) is then parsed at stage 634. Next, at stage 636, the message is prepared. In certain embodiments, a binary SMS message is prepared and designated to the SIM and carries a special identifier that tells the SIM where, and to which application, the information should go. Returning to FIG. 6C, at stage 638, the message contents are sent to the operator SMSC.

Figure 7A:
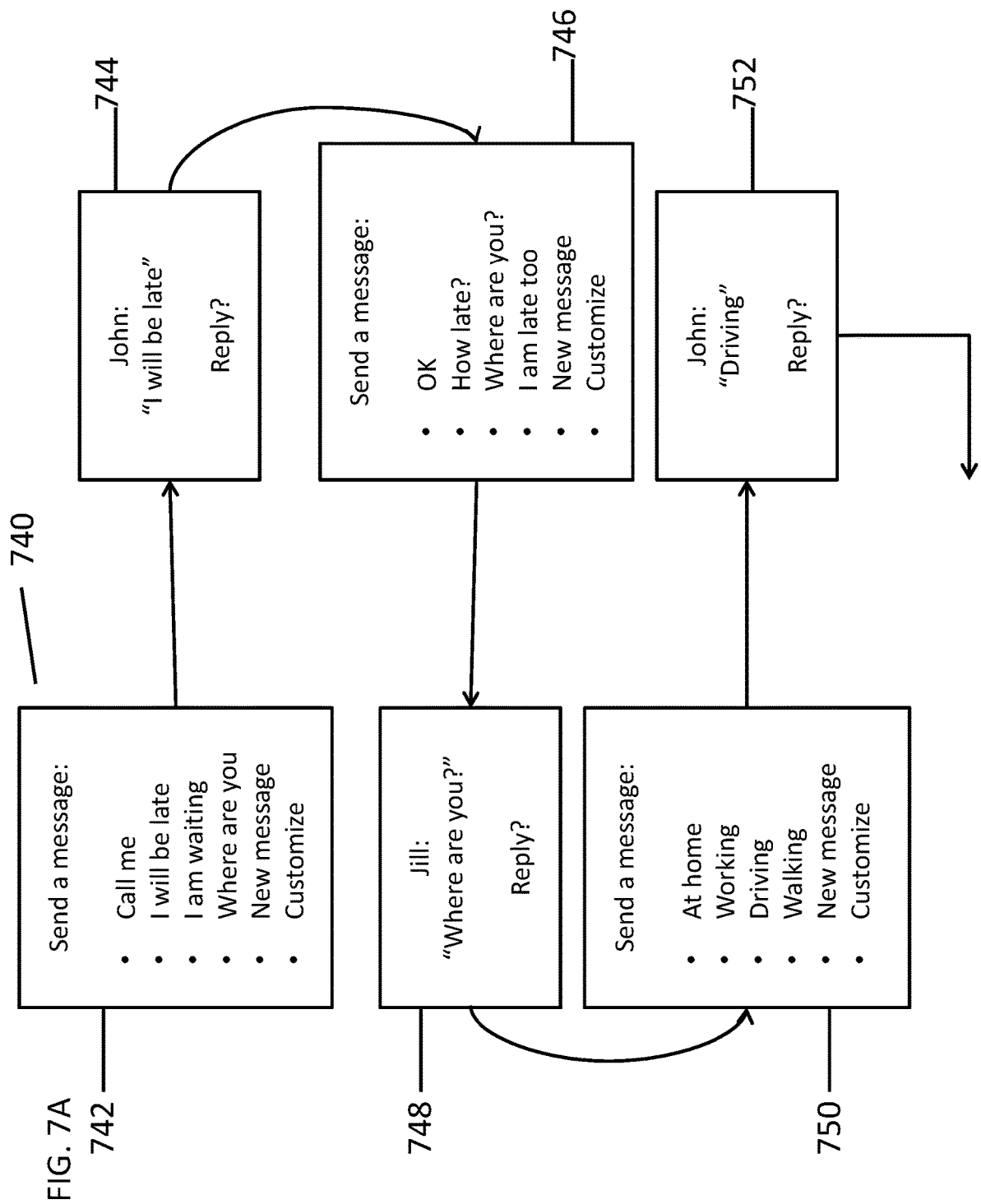
FIG. 7A illustrates two exemplary mobile devices displaying menus of predictive messages.
Figure 7C:
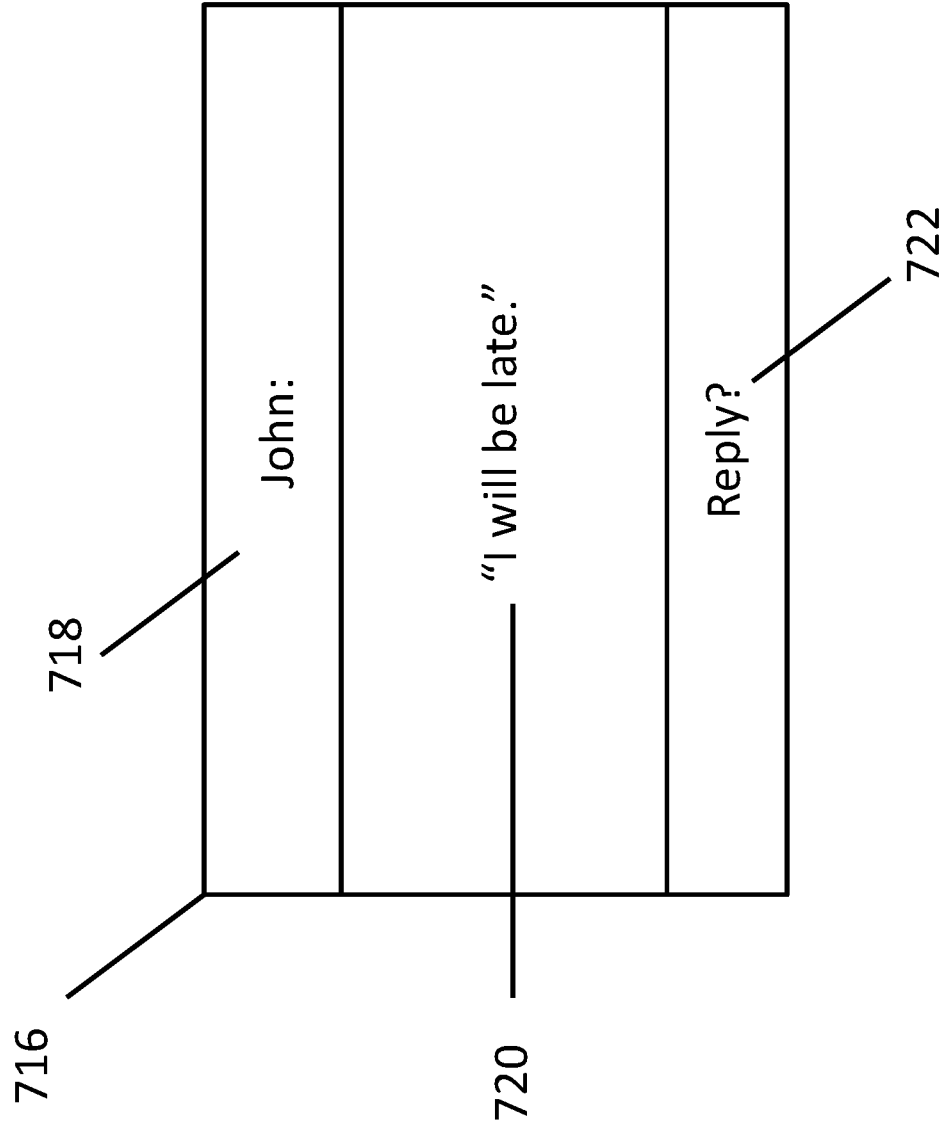
FIG. 7C illustrates an exemplary mobile device screen displaying an incoming message.

FIG. 7A is a flowchart depicting an exemplary text message exchange 740 between two users. On the left hand side are examples of displays on the mobile device 102 (as shown in FIG. 6A) of a subscriber, John. On the right hand side are examples of displays on the mobile device 104 (as shown in FIG. 6A) of another subscriber, Jill. In an exemplary embodiment where John uses mobile device 102 to call Jill on mobile device 104, but the call is terminated without a connection, exchange 740 begins at stage 742. In some embodiments, mobile device 102 comprises a first operating system and mobile device 104 comprises a second operating system. The mobile device screen shown at stage 742 will be automatically prompted to appear, giving John a menu of selectable items to send to Jill. Each presented option is clickable by a touch screen or a user selectable button on the interface of the mobile device. At 742, John selects "I will be late". After John selects an option, process 642 described in FIG. 6B is triggered and commences. Then, mobile device screen 744 will be automatically prompted to appear on Jill's screen where "Reply?" is a selectable option either via touchscreen or a user selectable button on the interface of the mobile device. If Jill selects "Reply?", mobile device screen 746 will be automatically prompted to appear on mobile device 104. The options presented in this screen are sample answers prepared by the server as predictive responses to the incoming text, in this case, "I will be late." from John. The response message options can be text messages, music files, pictures, video files, or other digital files. As in screen 742, the options on the list of potential messages in screen 746 are clickable by a button or a touch screen function. In some embodiments, the prepared predictive responses are displayed on the screen with the incoming text message. In such embodiments, the user can directly select a response without first having to select the "Reply?" option. In exchange 740, Jill selects messaging option "Where are you?". Then, mobile device screen 748 will be automatically prompted to appear on John's screen notifying her of Jill's response. When John selects "Reply?", he will be presented with mobile device screen 750. This display menu will have a list of selectable items that are predictive messages prepared in the server in response to Jill's message "Where are you?". John then selects the option "Driving" which is what appears on Jill's screen as seen at mobile device screen 752. This process can continue for as long as the two users choose to reply and remain engaged in a conversation. Each user will be able to see the message they received, be presented the option to reply, and if they choose to do so, be presented with a list of selectable menu items of pre-predicted responses to the incoming message.

FIG. 7B shows an exemplary mobile device screen 700 displaying a menu showing different phrases that can be included in a message, according to some embodiments. In certain embodiments, this screen is automatically displayed to a calling user when the calling user makes a call that does not connect. FIG. 7B includes a non-actionable header 702 that states "Send a Message". FIG. 7B also includes a plurality of actionable (also referred to as selectable) menu items, including an item for "Call me" 704, "I will be late" 706, "I am waiting" 708, "Where are you?" 710, "New message" 712, and "Customize" 714. Pressing each of the actionable menu items 704, 706, 708, and 710 can cause the device to automatically send a message containing the selected phrase to the called subscriber. The automated messaging system application can be downloaded to the mobile device or embedded on the SIM card with several most-commonly used messages pre-populated. For example, if the calling subscriber selects menu item "Call me" 704, the calling subscriber's mobile device can send a message stating "Call me" to the called subscriber. Similarly, if the calling subscriber selects menu item "I will be late" 706, the calling subscriber's mobile device can send a message stating "I will be late" to the called subscriber. Actionable menu items 708 and 710 can function in the same way. By providing the calling subscriber wither a menu of pre-set messages to send to the called subscriber, the automated messaging system application can make it easier for the calling subscriber to send messages, without having to type them in. In some embodiments, the user can select more than one phrase to include in the message.

If none of the messages associated with actionable menu items "Call me" 704, "I will be late" 706, "I am waiting" 708, and "Where are you?" 710 are appropriate, the calling subscriber can select menu item "New message" 712. When this menu item is selected, the automated messaging system application can display a new screen in which the calling subscriber can compose a new message to the called subscriber.

The "customize" menu item 714, as discussed in more detail below, can allow mobile subscribers to change the messages associated with items 704, 706, 708, 710, and 712, for example, by allowing mobile subscribers to edit the pre-set messages and/or add their own additional text.

If the calling subscriber selects the "customize" menu item 714, the automated messaging system application can cause one or more new screens to appear. In some embodiments, the screens can appear sequentially, one by one. The first screen can display:

Message 1:
"I will be late"
[blank data entry form]

The subscriber can type a new message in the blank entry form and change the message. For example, he can type "What's up?".

Then the second screen can appear as follows:

Message 2:
"I am waiting"
[blank data entry form]

The subscriber can add a new message by typing a new message or can choose to keep the same message.

Then, the third screen can appear:

Message 3:
"Where are you?"
[blank data entry form]

Again, the subscriber has the option to edit this message and replace it with a new message by typing a new message or instead has the option choose to keep the same message.

Message4:
"New message"
[blank data entry form]

In this case, the subscriber has the option to create a new message by typing a message and then send it.

In addition to having screens appear sequentially, the automated messaging system application can also allow the calling subscriber to specify which message he or she would like to customize, and jump directly to a screen that customizes the selected message. The automated messaging system can also display all or a subset of the customizing screens simultaneously. In yet other embodiments, the automated messaging system can allow the calling subscriber to customize more than one message at once.

The subscriber preferably has the option to send any one of the messages at the end of a call, which is disconnected without a connection. For example:

John calls Jill from his mobile phone. Jill's phone rings. Jill is busy; she does not answer the call. On John's phone screen (John is the Calling Party), the following list of options can automatically appear:

Send A Message:
Call me back
I will be late
I am waiting
Where are you?
New message
Customize Assuming John chooses the "Call me back" option from the menu, at this point, the automated messaging system application typically parses this menu selection and prepares a message. There are different scenarios as a follow up to this case:

In a first set of embodiments, if the application is set up to communicate and interact with an automated messaging system cloud server (e.g., see FIG. 6A), then the automated messaging system application installed on the calling subscriber's mobile device (e.g., John's mobile device) preferably has the cloud servers' destination address within its memory. This address can be a short code number at Mobile Operators' SMS center where the cloud server is connected or can be an IP address. For simplicity, the following paragraph explains an exemplary embodiment of how the service works for the SMSC connections.

The automated messaging system application takes the calling subscriber's (e.g., John's) menu selection, prepares a binary SMS message and includes the following information: Calling Subscriber's Name (John Smith), Personalized message's destination (Called Subscriber's mobile phone number, in this case, Jill's mobile phone number), and message content (e.g., "Call me back").

Then, the application sends the information to the automated messaging system cloud server destination address (e.g., short code at the operator SMSC 604, in FIG. 6A). The transmission of this information can correspond to Reference A in FIG. 6A. When the message reaches the short code at the SMSC (Reference B in FIG. 6A), the SMSC forwards this message to the automated messaging system cloud server 602 (Reference C in FIG. 6A). In an exemplary embodiment, short codes (which are also known as short numbers) can be special telephone numbers, significantly shorter than full telephone numbers, that can be used to address SMS and MMS messages from certain service providers' mobile phones or fixed phones. There are typically two types of short codes: dialing and messaging. A similar concept for voice calls is typically known as abbreviated dialing.

When the message is received by the automated messaging system cloud server, the message can be parsed and the following information can be compiled:

Name of the Caller: John Smith
Mobile Phone Number of the receiving party: +1 (617) 777-7777
(Jill's number)
Message Content: Call me back This supplemental information can be collected via different means. For example, the automated messaging system application installed on the calling subscriber's mobile device can automatically collect the calling subscriber's name (e.g., saved during the opt-in/opt-out/registration process) and the called subscriber's name (e.g., from the calling subscriber's mobile device's address book), and send it to the automated messaging system cloud server. Additionally, the calling subscriber's name, once manually entered by the user into the application during registration, can be sent once to the cloud server, and not re-sent with every message. The names of the calling and the called subscriber can also be collected by the cloud server via integration into a mobile network operator's billing platform or customer base management systems. For example, the cloud server could submit a request to a network element in the mobile operator's network, and request the subscriber name associated with a specific phone number. The cloud server can also obtain the name(s) of the calling and/or the called subscriber from a SMSC (Short Message Service Center). During the process of sending a message from one device to another, the device itself and/or components in the network 106 can be used to add the supplemental information to the message.

In addition, the following can also be captured from the incoming message:

Caller's Mobile Phone Number: +1 (508) 555-5555
Event Time: 9:15 AM

Then, the automated messaging system cloud server 602 can prepare the following new message:

"I called you at 9:15 AM, could not reach you.
Please call me back.
John Smith
+1 (508) 555-5555"

Then, the automated messaging system cloud server 602 can send this message to the Operator SMSC 604 for delivery to the destination phone number +1 (508) 555-5555. The transmission of this message can correspond to Reference D in FIG. 6.

The Operator SMSC 604 can then forward this prepared message to Jill's phone (e.g., Reference E in FIG. 6A). Jill's phone receives this message (e.g., Reference F) and displays to her the following message in the format that is sent:

"I called you at 9:15 AM, could not reach you.
Please call me back.
John Smith
+1 (508) 555-5555"

If John were to select "I will be late" from the application menu, then, the message would follow the same path and would arrive to Jill's phone as follows:

"I will be late.
John Smith
+1 (508) 555-5555"

In a second set of embodiments, the automated messaging system application can also be set up as a stand-alone application. In such embodiments, the process for transmitting messages from the calling subscriber to the called subscriber can be different.

The automated messaging system application can take the calling subscriber's (e.g., John's) menu selection (e.g., "call me back"), and prepare a message with the following information: Calling Subscriber's Name (e.g., John Smith), Personalized message's destination (e.g., Called Subscriber's mobile phone number, in this case, Jill's mobile phone number), and message content (e.g., "Call me back").

The stand-alone automated messaging system application can thus have the following information:

Name of the Caller: John Smith
Mobile Phone Number of the receiving party: +1 (617) 777-7777

(Jill's number)
Message Content: Call me back
Caller's Mobile Phone Number: +1 (508) 555-5555
Event Time: 9:15 AM Then, the automated messaging system application can send (e.g., as an SMS, MMS) the message to the called subscriber's phone number (Jill's number which is +1 (617) 777-7777).

Jill's phone receives this message and typically displays to her the following message in the format that is sent:
"I called you at 9:15 AM, could not reach you.
Please call me back.
John Smith
+1 (508) 555-5555"

FIG. 7C shows an exemplary mobile device screen 716 on mobile device 104 displaying a mobile device screen including a message from mobile device 102 (here "John") and an option to reply. Mobile device screen 716 displays message content 720, "I will be late." The mobile user can select "Reply?" either via touchscreen or a user selectable button on the interface of the mobile device.

FIG. 7D shows an exemplary mobile device screen 724 displaying a menu showing different phrases that can be included in a message from mobile device 104 to mobile device 102, according to some embodiments. FIG. 7D includes a non-actionable header 726 that states "Send a Message". FIG. 7D also includes a plurality of actionable (also referred to as selectable) menu items, including an item for "OK" 728, "How late?" 730, "Where are you?" 732, "I am late too." 734, "New message" 736, and "Customize" 738. Pressing each of the actionable menu items 728, 730, 732, and 734 can cause the device to automatically send a message containing the selected phrase to the calling subscriber from the called subscriber. Similar to item 712 in FIG. 7B, item 736 allows the creation of another message to be included in the menu. Similar to item 714 in FIG. 7B, item 738 allows the creation of a customized message.

FIG. 7E shows an exemplary mobile device screen 716 on mobile device 104 displaying a mobile device screen including a message from mobile subscriber 102 and an option to reply. Mobile device screen 716 displays message content 720, "Where are you?". The mobile user can select "Reply?" either via touchscreen or a user selectable button on the interface of the mobile device.

Turning back to the general description of embodiments of the disclosed subject matter, in some embodiments, in order to avoid false prompts due to mobile devices' lack of support for network events, the automated messaging system application can validate each mobile device on which it is installed. For example, prior to any screen prompts, the automated messaging system application can check if the calling party's device supports the proper call related network events. When the first call happens after the initial device start up, the automated messaging system application can wait for the proper three events to happen in the usual sequence:

1. Dial a number
2. Call Connected
3. Call Disconnected

If these three events happen and it is reported to the application by the mobile device (and/or the operating system), the automated messaging system application can assume that this device supports the relevant network events (e.g., the Call Connected and related network events). Until these three events are successfully reported to the automated messaging system application and are confirmed by the automated messaging system application, the automated messaging system application can remain silent (e.g., until the automated messaging system application can confirm compatibility of the mobile device, the automated messaging system application can operate in standby mode such that the subscriber cannot see the application or the related prompts).

As discussed above, in a first set of embodiments, the automated messaging system can have two components:
1. Automated messaging system application installed on a subscribers' mobile device
2. One or more automated messaging system servers (potentially implemented as cloud servers).

Although, in some embodiments, the messaging system servers can be omitted and the calling device can send a message directly to the called device.

The automated messaging system application installed on the mobile device can be embedded in the mobile device operating system, can be installed on the device operating system, and/or can be on the SIM card. The automated messaging system application can check the network events related to the calls (e.g., dialing a number, connecting a call, disconnecting a call). Depending on the chain of events during a call, the automated messaging system application can include the logic to automatically trigger or to not automatically trigger a prompt on the mobile device screen of the calling subscriber. The automated messaging system application can also have the intelligence to automatically prompt the calling subscriber if the call is disconnected without a call-connected event. The automated messaging system application can have the intelligence to collect the calling subscriber's name. The automated messaging system application can also have the intelligence to collect the device type from the calling subscriber's mobile device. The automated messaging system application can have the intelligence to communicate with the automated messaging system server via a network connection.

The automated messaging system application can have the intelligence to monitor the use of the automated messaging system by the subscriber. For example, if the subscriber is not using the automated messaging system (e.g., not sending messages), the automated messaging system application can ask the subscriber if he or she wants to terminate the service. If the subscriber chooses to send messages to the other party after a call without a connection, the automated messaging system application can include the intelligence to automatically prompt the calling subscriber with a list of pre-defined phrases to send as a message. If the subscriber wants to customize his or her frequently used messages, the automated messaging system application can allow the subscriber to customize his or her messages, and can store these customized messages for future use. The messages can be transported from the calling subscriber to the called subscriber via various methods (e.g., SMS, MMS, USSD, IMESSAGE®, FACEBOOK® message, a TWEET®, e mail, and/or data communication channels). Furthermore, the automated messaging system can store and/or prepare messages or media based on the party that the subscriber is contacting. In some embodiments, the subscriber identifies parties as a spouse, child, parent, friend, coworker, etc. to the system. In some embodiments, the automated messaging system can have the intelligence to propose response message options based on the party and/or based on past communications between the subscriber and the contacted party.

The one or more automated messaging system servers (which can be implemented as cloud servers) can have the intelligence to communicate with one or more of the automated messaging system applications installed on subscribers' mobile devices. The server can collect the device type of the respective mobile devices and can send a message to the respective applications to "turn off" the automated messaging system application in mobile devices that have known issues and/or bugs that interfere with the automated messaging system. The server can have the intelligence to receive messages and forward them to the called subscriber's address (which can be collected by the automated messaging system application). The server can collect the time of the respective call events and embed these times into the forwarded message. The time of the event is collected from the Mobile Operator SMSC message header. Each time, the Mobile Operator SMS center forwards an automated messaging system message (coming from an application), there is a time stamp within each message header. The automated messaging system server parses the header and determines the time of the event. The server can determine the type of device associated with the destination address and can format the message according to a format that is suitable for the destination equipment. For example, if the message is sent by a feature phone such as Nokia device, but the destination address correspond to an iPhone, the server can format the message so that it will display properly on an iPhone. This way, the service provides interoperability in between different mobile devices.

The automated messaging system application can also be used to send, in response to a call not being completed, pre-defined pictures and/or videos in addition to (or in place of) the messages described above. These pictures and/or videos can be shown to the called/calling subscriber in a small footprint after an unsuccessful connection attempt, and the called/calling subscriber can be asked to send these pictures and images at the end of the phone calls. This can automate and simplify the photo/video sharing process in between mobile devices. In some embodiments, the photo/video sharing can be two-ways. For example, the called subscriber's device can detect that a call was received, without being answered (e.g., by monitoring call control events on the called device), and if so, automatically prompt the called subscriber to share photos/videos, and even send a message back to the calling subscriber). In some embodiments the automated messaging system application can be configured to automatically prompt the called subscriber to send a photo/video and/or reply message back to the calling subscriber in response to receiving a photo/video and/or message from the calling subscriber.

In some embodiments, the automated messaging system application can be configured to determine whether the called number is a number capable of accepting messages (e.g., a mobile phone number, a SKYPE® number, a GOOGLE Voice™ number, a COMCAST® "land-line" that can receive text messages). If the number is capable of accepting messages, then the automated messaging system application can trigger as described above. If not, the automated messaging system application can prevent itself from prompting the calling subscriber to send a message. For example, if a caller calls a landline phone that is not capable of receiving text messages, then the automated messaging system application can prevent itself from automatically triggering after a call. This determination can be made using, for example, black lists and white lists.

In some embodiments, even if the called number is not capable of accepting messages, if the application has a corresponding alternate e-mail address or phone number associated with the called subscriber that is capable of receiving messages, then the application can still trigger as usual. The automated messaging system application can determine whether (and how) a called number is capable of receiving a message using a central clearinghouse (e.g., the cloud server). Devices can register with the clearinghouse to indicate whether they are capable of receiving messages, what type of messages can be received, and/or what applications are in use on the device (e.g., by indicating that FACEBOOK® is in use on a device, the automated messaging system application can know that this device is capable of receiving FACEBOOK® messages). The automated messaging system can also be configured to collect e-mail address and other communication addresses (e.g., SKYPE®, FACEBOOK®) at which a subscriber can receive messages. As a working example: the calling subscriber's mobile device can determine whether the called subscriber's device is capable of receiving messages via a first delivery channel, such as SMS or MMS messages. This determination can be done by comparing the called subscriber's phone number against a set of dialing rules, or by consulting a central clearinghouse (such as a database maintained at an automated messaging system server). If the called subscriber's device is capable of receiving messages via the first delivery channel, the calling subscriber's mobile device can send its message using the first delivery channel. If, however, the called subscriber's device is not capable of receiving messages via the first delivery channel, the calling subscriber's mobile device can determine if the called subscriber's mobile device is capable of receiving messages via alternate delivery channels, such as email, FACEBOOK®, or Twitter.

This determination can also be performed by consulting the central clearinghouse. If the calling subscriber's device determines that the called subscriber's device is capable of accepting messages in a second delivery channel (e.g., e-mail), the calling subscriber's device can send its message using this second delivery channel (e.g., the calling device can send an e-mail directly from an e-mail client on the mobile device). If the called subscriber's device can accept messages in multiple different delivery channels, the calling subscriber's device can pick which delivery channel to use based on a pre-programmed hierarchy of preferred delivery methods (e.g., a hierarchy that prioritizes email over Facebook, which is in turn prioritized over Twitter). As used herein, the term "delivery channel" can be thought of as alternate methods for transferring a message from a first device to a second device, wherein each channel has different capabilities and methods for presenting content.

At each time a subscriber is asked to send an automated messaging system message, he or she has the option not to send any message. The automated messaging system can have the intelligence to count the number of rejections and based thereon, can ask the subscriber if he or she would like to opt-out of the service if the service is not being used. The opt-out counters for the subscribers who have used the service and for the subscribers who has never used the service can be different. For example, if the subscriber has never sent any message, after 3 (three) times he chooses not send a message; he will be shown a screen to opt-out of the service. If, however, the subscriber has sent a message, before this counter can be set to 6 (six).

Figure 8:
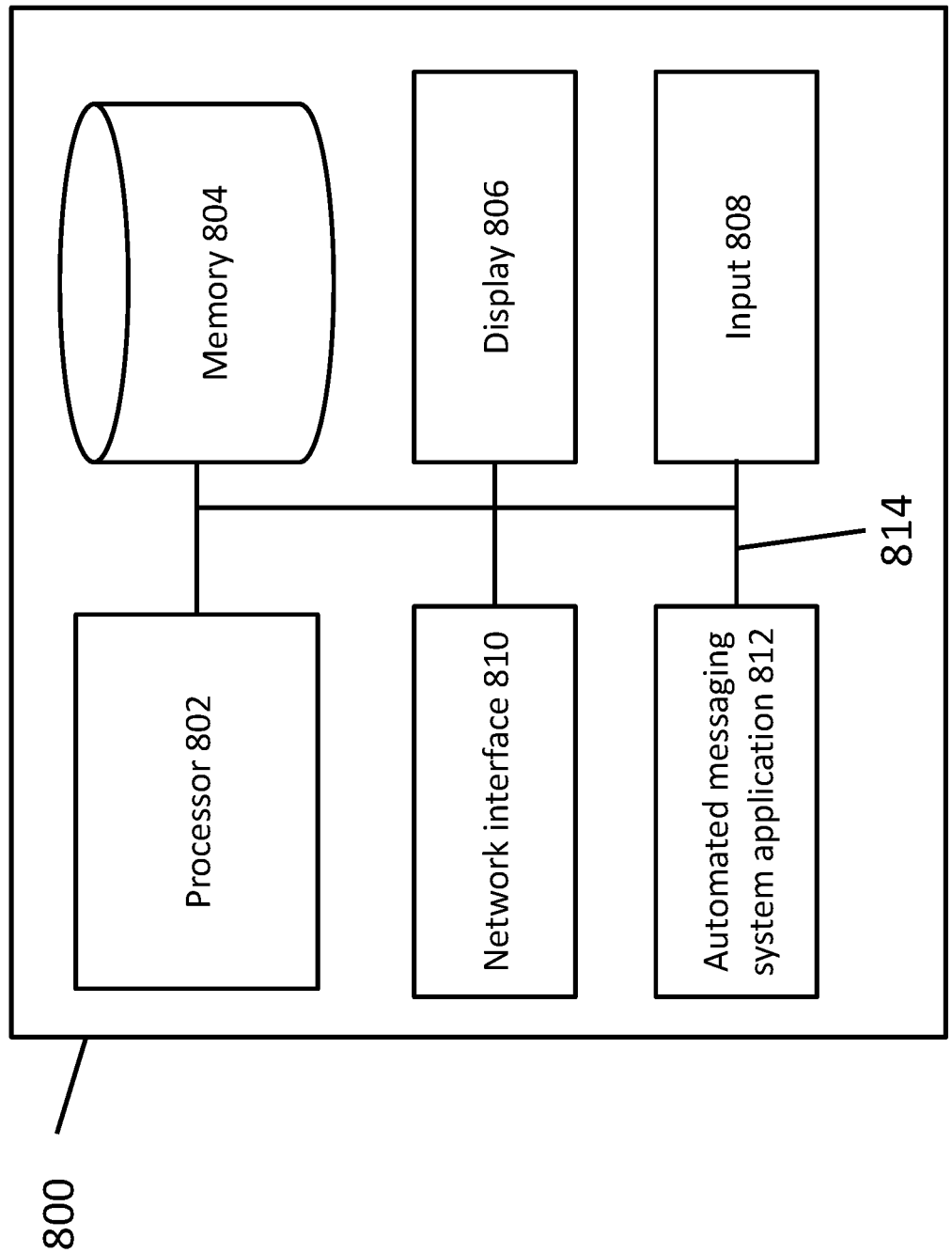
FIG. 8 is a block diagram illustrating exemplary components of a subscriber's mobile device on which an automated messaging system application has been installed.

FIG. 8 is a block diagram showing exemplary components of a subscriber's mobile device 800 on which an automated messaging system application has been installed, in accordance with some embodiments. FIG. 8 includes processor 802, memory 804, display 806, input 808, network interface 810, and automated messaging system application 812. Each of these components can be connected, directly or indirectly (e.g., through intervening components) with at least some of the other components via internal bus 814.

Processor 802 can include any special-purpose or general-purpose processor capable of executing instructions. Examples of processors can include special purpose logic circuitry, a FPGA (field programmable gate array), a microprocessor, a microcontroller, an arithmetic logic unit (ALU), and/or an ASIC (application-specific integrated circuit). While a "processor" is discussed here, it is to be understood that in some embodiments a "processor" can include multiple processors.

Memory 804 can include any storage memory capable of storing data and/or computer readable instructions, including all forms of volatile and non-volatile memory (e.g., EPROM, EEPROM, RAM, ROM, magnetic disks, flash memory devices, optical disks, etc.).

Display 806 can include any component that conveys information to a user, including a display screen, a set of indicator lights, an audio speaker that provides audio output, and/or a haptic mechanism that provides feedback to a user in the form of tactile vibrations.

Input 808 can include any component that can receive user input, such as a keypad, buttons, a trackball, a mousepad, a camera, or a microphone via which a user can provide spoken or audible input. In some embodiments, display 806 and input 808 can be combined into an actionable touchscreen that can both display data and receive user input.

Network interface 810 can be used by the mobile device to send data to and receive data from an external network, such as network 106 in FIG. 1. Network interface 810 can include, for example, a wireless transceiver configured to send and receive cellular, Bluetooth, RFID, infrared, or other types of wireless signals.

Memory 804 can store instructions that can be executed by processor 802 to implement a mobile device operating system (not shown), as well as applications that run on the mobile device operating system. In some embodiments, the automated messaging system application 812 can be one of these applications. Although automated messaging system application 812 is depicted as a separate component in FIG. 8, automated messaging system application 812 can be implemented purely as a set of instructions stored on memory 804, and not as a tangible hardware component. In other embodiments, the automated messaging system application 812 can be implemented on a SIM card or other specialized, physical hardware component that interfaces with processor 802 and memory 804 via internal bus 814.

The automated messaging system application 812 can work in conjunction with processor 802, memory 804, display 806, input 808, and network interface 810 to implement any of the processes described above.

For example, the automated messaging system application 812 can work in conjunction with any of the components described above to implement the process of obtaining and initializing the automated messaging system application discussed above in relation to FIG. 2. When the automated messaging system is implemented as an application that is downloaded and installed on the mobile device (e.g., from an app store), the application can be downloaded via network interface 810 and stored in memory 804. In embodiments involving a cloud server that checks the device to determine if it should be blacklisted, information regarding the device's technical specifications and configurations can be stored in memory 804, and can be relayed to the cloud server via processor 802 and network interface 810. Information provided by the subscriber during the opt-in or opt-out process, such as the subscriber's name/identifying information, or billing information, can be received by the mobile device via input 808 and saved in memory 804.

The automated messaging system application 812 can also work in conjunction with any of the components described above to implement the process for determining whether to "trigger" the automated messaging system application discussed above in relation to FIG. 3. The automated messaging system application 812 can detect call control events associated with the mobile device directly, e.g., by interfacing directly with the network interface 810. Alternatively, the automated messaging system can receive notifications of call control events from the mobile device operating system implemented by processor 802 and memory 804. Also, as described above, the automated messaging system application 812 can receive notifications of call control events from a SIM Toolkit Framework (STK). The dialing rules discussed above, which can be used to, for example, look up whether a called phone number corresponds to a mobile device or a fixed land-line device can also be stored in memory 804.

The automated messaging system application 812 can also work in conjunction with any of the components described above to determine whether the mobile device on which it is installed has the capability to differentiate between a network originated and a mobile device originated call event (e.g., as discussed above in relation to FIG. 4). Similarly, the automated messaging system application 812 can also work with any of the components described above to determine whether or not to display the messaging menu when a "Call Disconnected" event is received (e.g., as discussed above in relation to FIG. 5).

In some embodiments, memory 804 can contain a record of previous call events (e.g., "Call Control" events, "Call Connected" events, and "Call Disconnected" events). In some embodiments, this record of previous call events can also include the phone number(s) and time(s) associated with each call event. The automated messaging system application 812 can access these records stored in memory 804 to determine whether a "call disconnected" event is associated with a previously received "call connected" event, in order to determine whether to display the menu of pre-set messages for the called subscriber.

As another example, automated messaging system application 812 can store in memory 804 certain configurations, settings, and indications. For example, memory 804 can store an indication that the mobile device supports the conditions for the automated messaging system application to operate, and that the automated messaging system is therefore enabled for future call control events (e.g., memory 804 can store an indication regarding whether the mobile device is capable of understanding a Network Originated call connected event). Memory 804 can include records of customized messages received from a subscriber, so that the mobile device can use the customized messages in the future. Memory 804 can also include a record of the number of times a subscriber has rejected prompts to send pre-set messages, such that the automated messaging system application can prompt the user after a certain number of rejections whether or not the subscriber would like to continue using the automated messaging system. For embodiments that rely on Operator's SMSC 604 to forward sent messages, memory 804 can be used to store the designated short code for Operator's SMSC 604. For embodiments in which the automated messaging system application can communicate directly with the automated messaging system cloud server 602, memory 604 can be used to store an IP address or other address information pertaining to the automated messaging cloud server 602.

FIG. 9 shows an exemplary process by which predictive messaging options are kept up to date. AAA, BBB, CCC, DDD, EEE, FFF, GGG, HHH, III, JJJ are all predictive response options to a message XXX. Though all are potential replies to an incoming message, not all of them are always available for the subscriber's use. In FIG. 9, items 902, 904, 906, 910 and 912 are messaging options that are displayed on a menu on a user's screen as clickable responses. In some embodiments, items 914, 916, 918, 920 and 922 are predictive message responses that are not displayed as options to a subscriber, but ones that are still stored in the server. In certain embodiments, the predictive messages are stored at the device. A function in the cloud server will calculate the frequency with which each option was used, among subscribers at a regular time interval in a geographic area. Items 924 through 932 show these figures. Item 924 is the frequency with which messaging option 902 was used. Item 926 is the frequency with which messaging 904 was used. The same holds true for item 928, 930 and 932. In some embodiments, the application will then take the messaging option associated with the lowest frequency and replace it with one of the stored messages. For example, in FIG. 9, messaging option 912 was used the least (as seen by its frequency, item 932, relative to the other frequencies). Thus, the next time the automated messaging system application is triggered, messaging option 912 will be replaced by messaging option 914. Stage 944 at the next update shows the edited list of messaging options. Now, items 902, 904, 906, 910 and 914 are available for use of the subscriber. The new frequencies are calculated for each of the messaging options. So, item 934 is the frequency with which messaging option 902 was used in the next update. Item 936 is the frequency with which messaging option 904 was used in next update. The same holds true for item 938, 940 and 942 in week 2. As item 914 was used with the lowest frequency, in the update that follows, it will be replaced with item 916. This rotation can happen periodically, e.g., each day, week, month, quarter, year, etc., switching out the least used messaging option with a stored alternative to ensure that users are presented with responses that are most relevant to their needs.

The example described above explained customizing the displayed menu on mobile devices based on global user behavior. These menus are also customizable on an individual level that makes it more personal to a subscriber. The same process would follow, the only difference being the way in which the frequencies are calculated. Instead of amassing and analyzing data from all subscribers, the figures for items 924-942 would be obtained by monitoring the number of times the individual user uses a certain messaging option.

In some embodiments, this predictive messaging system can be limited to a certain geographic area. It is understood that different phrases and responses are used in different areas around the globe. Thus, in some embodiments, the systems and methods disclosed herein can be customized to reflect the common responses for a particular geographic area, e.g., a country, state, city, county, region, continent, etc.

These processes can be replicated for all messaging options and their own corresponding, pre-prepared list of potential responses.

For example, messaging options 902-912, ones that are displayed as clickable items on the mobile device, could be "Ok", "What's up?", "I am in a meeting", "I will call you later" and "Call me later", respectively. These prepared predictive messages would all be in response to the incoming message "Call me back". Messaging options 914-922, ones that are stored in the server but not presented to the user, could be "I will call you soon", "What do you need?", "Give me 10 minutes", "Is it urgent?" and "I can't". In this example, the time interval with which the messaging options are updated would be one week. In week 1, say that messaging option 912, "Call me later", was the least used. Then, for the next week, messaging option 912 would be switched out with the first message on the list of options that are stored, but not initially displayed to the subscriber. In this situation "Call me later" would be replaced with item 914, "I will call you soon". Thus, in week 2, the messaging options presented to the user as responses to the incoming message "Call me back" would be "Ok", "What's up?", "I am in a meeting", "I will call you later" and "I will call you soon", items 902, 904, 906, 910, 914 respectively. The list of messaging options stored in the server for later use would be "Call me later", "What do you need?", "Give me 10 minutes", "Is it urgent?" and "I can't". The same method would follow for successive weeks so that the user has is presented the most relevant responses.

As discussed, in some embodiments, the systems of this disclosure are static. In such embodiments, the system provides message response options to a mobile device based on frequency of response message options used in a particular geographic area. This embodiment is advantageous because it can save memory on a SIM card in a SIM-cloud system and can save traffic over the network (i.e., by minimizing the amount of communication between the application and the cloud server).

In other embodiments, the systems of this disclosure are dynamic. In such embodiments, the system can learn behavior and evolve so as to improve the accuracy of the predictive messaging. The system can provide response message options based on additional factors. Such additional factors include, but are not limited to, the subscriber, the time of day, the time of year, and the location of the subscriber. For example, response message options may be different if a subscriber is contacting a spouse, child, parent, friend, or coworker, etc. In some embodiments, the system can access the contacts of the mobile device. In some embodiments, the message options can change if a called subscriber is identified in the calling subscribers contacts as a "favorite." In some embodiments, the subscriber can identify to the system which subscribers are a spouse, child, parent, favorite, friend, coworker, etc. Furthermore, in some embodiments, the system can provide different message response options based on the frequency of communication between the subscribers. For example, if subscriber John messages subscriber Jill multiples times per day, the system can read the contents of those messages and determine which messages are sent most often, regarding what topic, etc. In such embodiments, the system can provide message response options that take the frequency and/or content of prior message into account. In another example, where subscriber John rarely messages subscriber Jill, the system can provide message response options based more on other factors such as common response messages sent in that particular geographic area, time of day, time of year, etc.

In some embodiments, the system can provide message response options based on the time of day. For example, during the morning, the system can provide message response options more typically sent during the morning, e.g., messages about breakfast, coffee, etc. During the afternoon or nighttime, the system can provide message response options that are more typically sent during those times. In other embodiments, the system can provide message response options based on the time of year.

The systems and methods disclosed herein are designed to evolve so that the accuracy of the predictive message response options improves. The system can accomplish this by taking into account numerous factors. The foregoing examples and embodiments are meant to be illustrative and not limiting. A person of ordinary skill in the art would understand that additional factors can be added into the system to improve the accuracy of the predictive messaging. Over time, as the system reads messages, predicts message response options, and changes the message response options based on multiple factors, the accuracy of the predictive message response options can improve.

Figure 10:
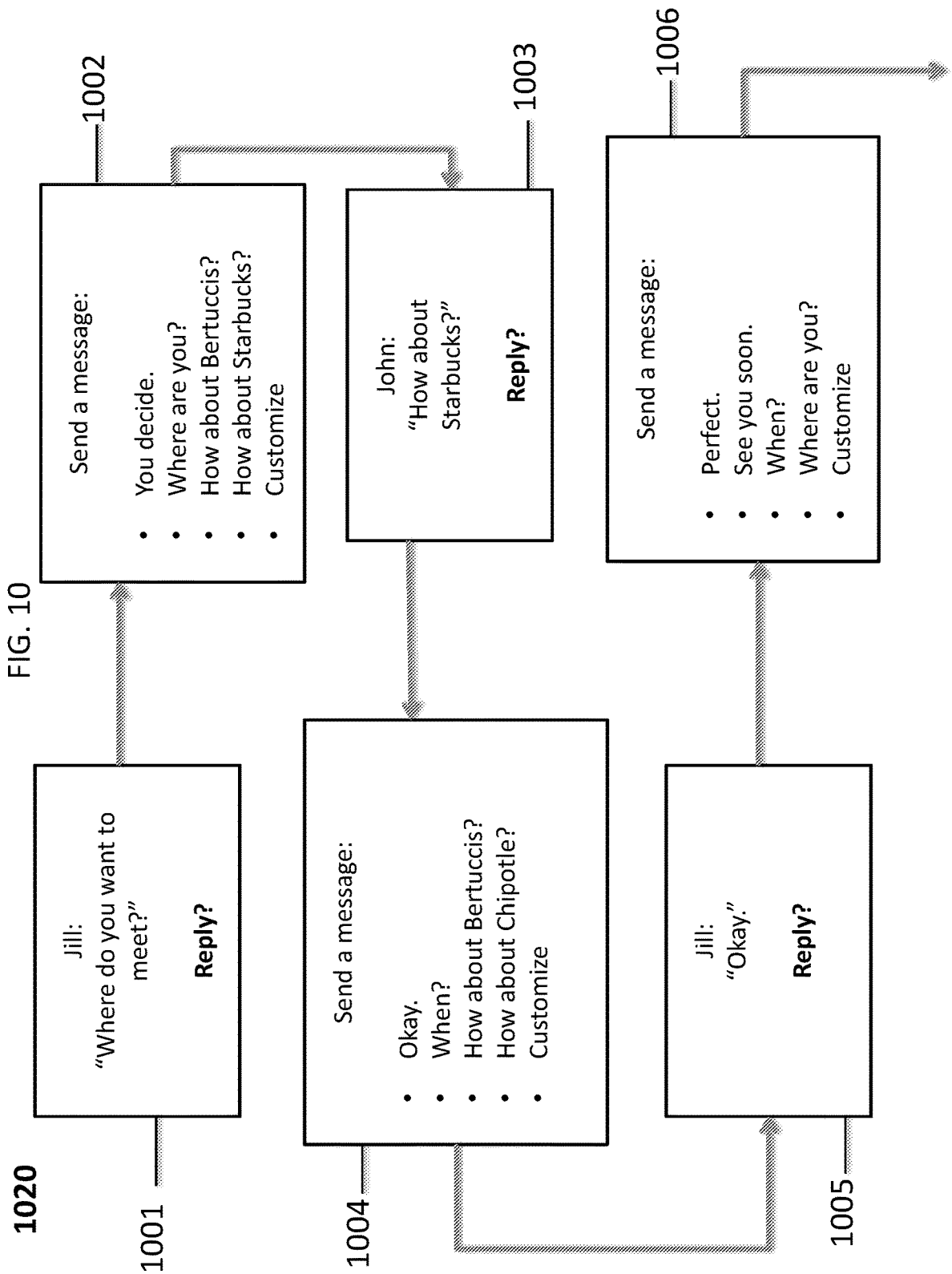
FIG. 10 illustrates an exemplary message exchange between two mobile devices displaying menus of predictive messages.

FIG. 10 is a flowchart depicting exemplary text message exchange 1020 between two users. On the left hand side are examples of displays on the mobile device 102 (as shown in FIG. 6A) of subscriber John. On the right hand side are examples of displays on the mobile device 104 (as shown in FIG. 6A) of subscriber Jill. The screen shown at stage 1001 depicts the incoming message from Jill on John's mobile device. In some embodiments, when John clicks "Reply", the application or server will search for nearby third parties. In some embodiments, the application or server will search based on server or user defined distance parameters. In some embodiments, the systems and methods discloses herein can read the message and determine the contents of the message. Based on the contents of the message, the systems and methods can search for third parties that are relevant to the contents of the message. In some embodiments, the third parties are businesses, government or municipal buildings, museums, restaurants, bars, hospitals, medical offices, or other points of interest. In some embodiments, a third party can request that it be included as a response option based on the contents of a message and/or based on the location of the mobile device. For example, STARBUCKS® may request or contract with the system so that a response related to STARBUCK'S® is included as a response option to any message that contains "coffee." In some embodiments, a third party response option can be included based on the proximity of the location of the third party to the mobile device. In some embodiments, this proximity is limited by user- or server-defined distance parameters. For example, the STARBUCK'S® response option can be included based on proximity of a STARBUCK'S® coffee location to the mobile device based on user- or server-defined distance parameters. In other embodiments, a third party response option can be included based on the location of the mobile device, but not necessarily based on proximity to the mobile device (e.g., the mobile device is located in a certain city, town, neighborhood). For example, the STARBUCK'S® response option can be included based on the location of the mobile device, but not necessarily the proximity (i.e., if the mobile device is located in the city of Boston).

Returning to FIG. 10, if the system is searching for third parties within 5 miles of the mobile device, it may find 5 different third parties. Then, the system can sort the third parties in descending order of their proximity to the mobile device. In some embodiments, the top one, two, three, four, etc. third parties based on proximity can be included as potential responses. For example, in FIG. 10, the closest two third parties are Starbucks and Bertuccis and are included as response options. Hence, mobile device screen shown at stage 1002 provides a menu of selectable response options, including response options related to Starbucks and Bertuccis. The mobile device screen at stage 1003 shows that John has selected the messaging option "How about Starbucks?" to send to Jill. Similar to stage 1002, the mobile device screen at stage 1004 shows potential response options to the incoming message "How about Starbucks?". This time, the system has read John's message, ruled out Starbucks as a response option, and has used the closest non-Starbucks third parties as response options, e.g., Bertuccis and Chipotle. In other embodiments, Starbucks can still be included as response option, e.g., "Starbucks sounds great." In some embodiments, the system can predict message response options based on previous message response options selected. For example, if John and Jill always select to meet at Starbucks, this message response option can be included as an option, even if it's not the closest third party. The systems of this disclosure can store messages sent between subscribers. The system can analyze previous messages and use the contents of those previous messages as a factor when preparing predictive response message options.

At stage 1005, it is shown on John's mobile device screen that Jill chose to respond using the message option "Okay". The following screen at stage 1006 is generated using the same method for predictive messaging as explained earlier in this document.

This enhanced messaging platform may also relate to brands. Companies with a desire to expand their market outreach may desire to feature their name in a messaging option presented to mobile users in a display menu. For example, when subscriber 1 and subscriber 2 are messaging each other, the device screen can display a menu with a plurality of selectable items. If Company X wants to advertise using the disclosed systems and methods, one of the message options on the display menu could be "I am going to Company X".

In some embodiments, messaging relating to brands can also be location-based or event-based. For the former option, the application will search for nearby businesses that have elected to use predictive messaging for advertising. For example, if subscriber 1 messages subscriber 2 saying "Where would you like to meet?", subscriber 2 will be presented with a menu of response options that may include "Let's meet at Company X". To present that list item, the application will use user or server defined distance parameters to locate businesses, e.g., Company X, Y and Z. Then, the service can determine which is the closest to the subscriber and include that in the predictive messaging menu. The same menu can also be event-based. In this scenario, the server will have stored various events with time restrictions. These events may be referenced in predictive messaging options throughout the duration of the event. These events can be anything from a movie promotion, sports event, cultural tradition, etc. For example, if subscriber 1 messages subscriber 2 asking "What is going on in town?", subscriber 2 will be presented with a menu of response options that may include "I am going to the Red Sox game tonight" which may be presented to subscribers for a window of 5 hours.

Figure 11:
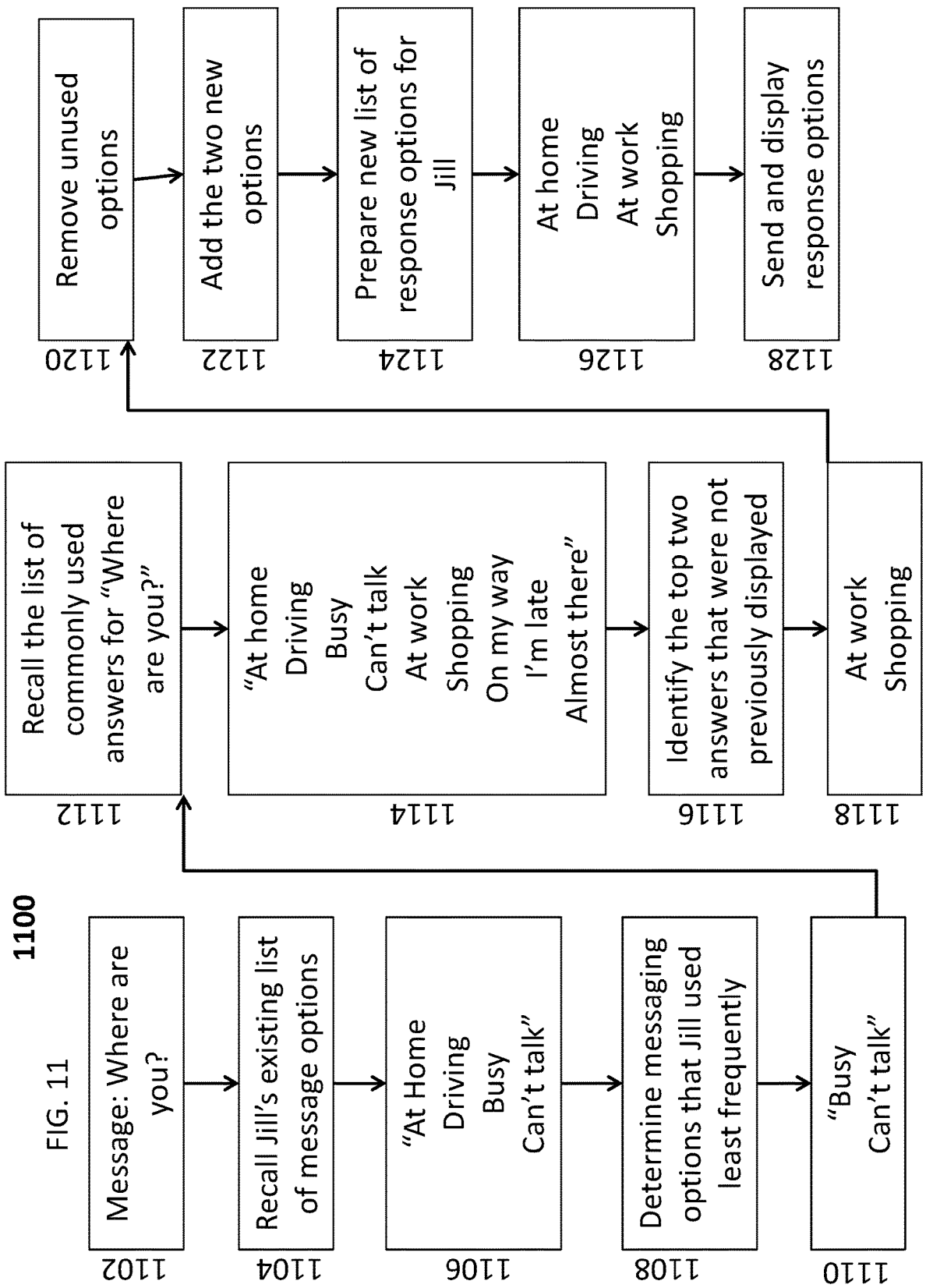
FIG. 11 illustrates an exemplary process by which the automated messaging system application displays up-to-date messaging options for the subscriber.

FIG. 11 is a flowchart depicting an exemplary process 1100 by which the automated messaging system application displays up-to-date response message options for the subscriber. At stage 1102, mobile device 102 user John has sent a message to mobile device 104 user Jill displaying "Where are you?". The steps in FIG. 11 exemplify stage 632 in FIG. 6C in greater detail. Specifically, FIG. 11 exemplifies how a list of response message options is prepared in the automated messaging system server to be sent to mobile device 104. At stage 1104, the server will recall the list of response message options that was previously displayed to Jill when she had an incoming message with the content "Where are you?". In some embodiments, the server will also check to see response message options that were sent to Jill in response to "Where are you?" received from the specific subscriber, in this case mobile device 102. An example of such a list is shown at stage 1106, where "At home", "Driving", "Busy" and "Can't talk" are four previously prepared response message options that were presented to Jill. Next, at stage 1108, looking at Jill's user history and messaging habits, the server will determine the two messaging options that she has used the least. In this example, the messaging options "Busy" and "Can't talk" are the options that Jill has used the least. At stage 1112, the server will recall the list of stored predictive message responses associated with the message "Where are you?" that could be used as potential responses. This list can comprise response message options from a specific geographic area or globally. This list could be one such as the one shown at stage 1114, including response message options "At home", "Driving", "Busy", "Can't talk", "At work", "Shopping", "On my way", "I'm late" and "Almost there". At stage 1116, the server can identify the two most popular message options that were not shown to Jill the last time a menu with predictive message responses to the text "Where are you?" was displayed to her. Thus, messages "At home", "Driving", "Busy" and "Can't talk" are not viable options to substitute in place of the least used messages from the last menu ("Busy" and "Can't talk) for the updated menu that is to be presented to Jill. The top two messages in this list can be determined by sorting for the ones that are most commonly used on a global, local or individual level. Note that for the purpose of this example, two messages were replaced. However, any number of messaging options on the display menu may be updated. Further, although four response message options are used in this example, any number of response message options may be used in the list of response messaging options. In this example, the top two messaging options are "At work" and "Shopping" as shown at stage 1118. In order to prepare the new list of predictive message responses, the two unused options "Busy" and "Can't talk" are removed and replaced with the new "At work" and "Shopping". Thus, the new and updated list to be presented to Jill is "At home", "Driving", "At work" and "Shopping" as shown at stage 1126. Finally, the message package comprising the message content "Where are you?" and the menu of response message options is sent to Jill's mobile device 104 and displayed in a menu with a plurality of clickable items for Jill to select from. In some embodiments, this process of providing up-to-date response message options can be run every time Jill receives a message. In other embodiments, this process of providing up-to-date message reply options occurs periodically, e.g., once per day, week, month, or year, etc. A person of ordinary skill in the art would appreciate that the period could be any useful defined period of time. In some embodiments, the process occurs depending on how many times a subscriber has received a specific message, e.g., every time a subscriber receives "Where are you?", or every set number of times, e.g., every $2^{nd}$, $3^{rd}$, $4^{th}$, $5^{th}$, $6^{th}$, $7^{th}$, $8^{th}$, $9^{th}$ or $10^{th}$ time. A person of ordinary skill in the art would appreciate that the number could be any useful number.

Figure 12:
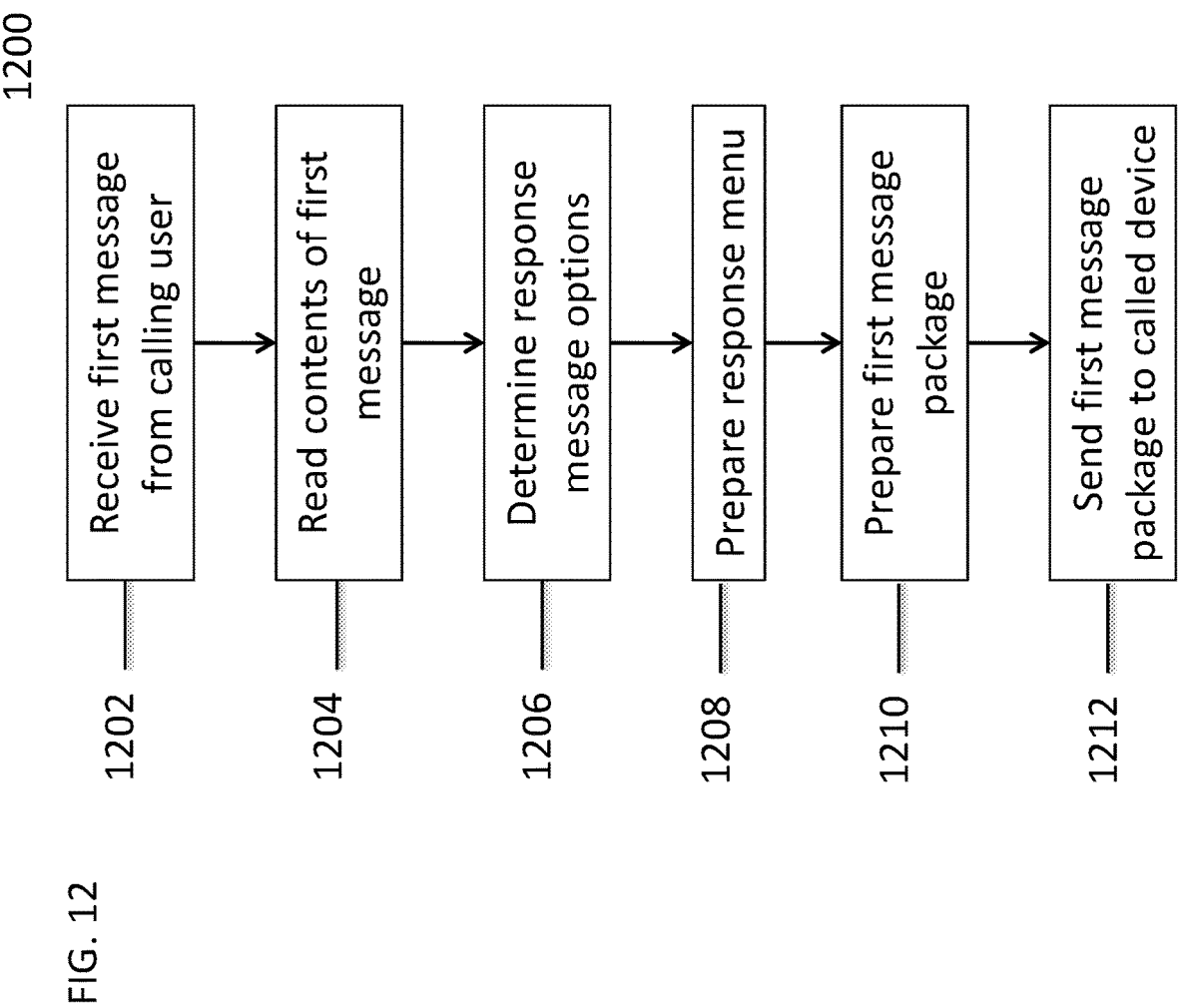
FIG. 12 illustrates an exemplary process for preparing a response message package.

FIG. 12 is a flowchart depicting exemplary process 1200 for preparing a first message package when a called user is automatically prompted to send a message to a calling user. For the purposes of this figure, the called device is mobile device 104 and the calling device is mobile device 102. In some embodiments, process 1200 occurs assuming that mobile device 104 has missed a call from 102 and the user of mobile device 102 has chosen to send a message to mobile device 104. However, this disclosure is not limited to this embodiment after a missed call. In other embodiments, process 1200 may be initiated by the user through the application installed on mobile device 102.

At stage 1202, the automated messaging system server receives a first message from device 102 to be sent to device 104. The server reads the contents of the message. Then, at stage 1206, the server will recall a list of predictive response messages that correspond directly to the incoming message. The server then prepares a response menu comprising one or more predictive messages. In some embodiments, the response menu options are based on previous message response options sent to mobile device 104. In some embodiments, the response menu options are based on the mobile device from whom mobile device 104 is receiving a message. For example, in some embodiments, the server can ascertain whether mobile devices 104 and 102 send messages to each other frequently, the nature of those messages, whether either device has identified the other device as a favorite, friend, co-worker, spouse, child, etc. The system can take any number of these factors into account when determining message response options.

At stage 1210, the server prepares a first package message including the message from 102 and prepared potential response message options. Finally, the first message package is sent to the called device at stage 1212.

The disclosed systems and methods are advantageous for smartphones. Mobile users today tend to employ habits that are faster and more efficient. The systems and methods disclosed herein further simplify the message exchange process and are very helpful to the modern technology community by providing a messaging platform that does not require typing. When mobile users receive a message and are presented a menu with related predictive message responses, they may opt not to reply with any of those options. Instead, they may prefer to "customize" an answer, which will be an option as the last list item on the menu. These customized answers can be retained by the system server and collected as top priority options for message responses. The disclosed messaging system is one that, in receipt of an incoming message, a contacted subscriber will be presented with a number of responses generated from the answers collected in the server without having to type anything to cue the application. This potential provides subscribers with an enhanced user experience.

While triggering the automatic messaging directly after a call allows for a timely, relevant, and easy method of communicating, this disclosure is not limited to such embodiments. This disclosure includes other embodiments of the methods and systems described herein that allow a user to begin a communication with a second party without having to make or miss a phone call initially. For example, users can manually launch an application directly from their mobile device, and can choose a contact with whom to begin a messaging session. This contact selection could come from an integration with the device's native phonebook, or the contact could be chosen from a friend list built within the messaging application itself. Further, a user could manually type the mobile phone number of the second party into the application to begin a communication session. Contacts can be identified by mobile number, email address, social network ID, user names defined within the application, or other unique identifiers.

Once launched, in some embodiments, the user can be presented with the same list of predefined messaging selections for the chosen contact that he would see after a missed call event. Both parties (the initiator and message receiver) can then commence and carry on a communication session using predictive, predefined messages that are presented in a menu format as described herein.

The systems and methods of this disclosure can determine the geographic location of a mobile device or receive information about a mobile device's geographic location. The systems and methods disclosed can determine or receive information about physical locations and regions, including position, bounds, neighboring areas, neighborhood/city/county/state/country/continent, or other geographic attributes. In some embodiments, the systems and methods disclosed herein can compute distances between two points on Earth, or between points and areas, or determine if a point is within a given distance range of another point (e.g., if a third party is within a user- or served defined distance from a mobile device). In some embodiments, the location of a mobile device is catalogued by a geohash reference. The system is able to transform between geohash strings and spatial coordinate pairs at varying levels of precision according to one or more algorithms which are known to those familiar with the state of the art in geospatial encoding.

Other embodiments are within the scope and spirit of the disclosed subject matter.

The subject matter described herein can be implemented in digital electronic circuitry, or in computer software, firmware, or hardware, including the structural means disclosed in this specification and structural equivalents thereof, or in combinations of them (including SIM cards). The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

While "missed calls" are described herein, this term is broad and can cover situations where a call was attempted from a first user to a second user and, for some reason, the call did not connect. For example, each of the following can be considered missed calls: i) the second user does not answer the call, ii) the call goes to the second user's voicemail instead of being answered by the second user, iii) the mobile network operator intercepts the call and plays a notice to the first user, and iv) a call that does not connect due to billing issues.

Additionally, the specification herein refers to calls "disconnecting." This does not require that a call actually connect before it can disconnect. For example, when a first user attempts to call a second user and the first user hangs up before the second user answers, the call can "disconnect" and a missed call can result. As another example, a call can disconnect when it is answered by a voicemail system rather than being answered by the second party.

One or more references is incorporated by reference herein. To the extent that the incorporated information conflicts with the present application, the present application shall control.

What is claimed is:

1. A computer implemented method for sending a message package to a called device, the message package configured to prompt a called mobile device user to select a message to send to the calling device, the method comprising:
   receiving, at an automated messaging system server operably connected to a mobile operator's network, a first message from the calling device, the first message addressed to the called device and comprising contents;
   reading, at the automated messaging system server, the contents of the first message;
   determining, at the automated messaging system server, a plurality of response message options, wherein determining comprises:
     determining at least one response message option based on the contents of the first message;
     determining the date when the first message was received at the automated messaging system server;
     determining whether the date falls in a specified date range; and
     when the date falls within the specified date range, including a holiday response message option, comprising contents related to a holiday within or near the specified date range, in the plurality of response message options;
   preparing, at the automated messaging system server, a response menu comprising the plurality of response message options;
   preparing, at the automated messaging system server, a first message package comprising the first message and the response menu; and
   sending, from the automated messaging system server, the first message package to the called device,
   wherein the first message package is configured to cause the first message and the response menu to be displayed on a screen of the called device, thereby prompting the called mobile device user to select a message.

2. The method of claim 1, wherein determining the plurality of response message options further comprises:
   comparing the contents of the first message to messages stored at the server or at a connected server;
   identifying one or more response messages stored at the server or a connected server previously sent in response to the first message; and
   compiling a list of response message options comprising one or more of the response messages identified.

3. The method of claim 2, wherein identifying one or more response messages stored at the server or a connected server previously sent in response to the first message comprises identifying one or more response messages previously sent from the calling device to the called device.

4. The method of claim 2, wherein the list of response message options is ordered based on the frequency with which the identified response messages were sent.

5. The method of claim 2, further comprising storing the list of response message options.

6. The method of claim 1, determining the plurality of response message options further comprises:
   determining whether the first message has been previously sent from the calling device to the called device;
   identifying, when the first message has previously been sent from the calling device to the called device, one or more previous response messages sent from the called device to the calling device in response to the first message; and
   compiling a list of response message options comprising one or more of the previous response messages identified.

7. The method of claim 5, further comprising:
   compiling a second list of response message options by identifying one or more responses messages previously sent in response to the first message, wherein the second list of response message option comprises one or more response messages previously sent in response to the first message;
   placing the second list of response message options in order based on the frequency with which the response messages were sent;
   replacing the stored list of response message options with the second list of response message options.

8. The method of claim 1, wherein determining the plurality of response message options further comprises:
   comparing the contents of the first message to messages stored at the server or at a connected server;
   identifying one or more third party response message options stored at the server or at a connected server that correspond to the first message; and
   compiling a list of response message options comprising one or more third party response message options identified.

9. The method of claim 8, wherein the one or more third party response message options comprises contents related to a holiday within or near the specified date range.

* * * * *